US012616901B2

(12) United States Patent
Hegedüs et al.

(10) Patent No.: US 12,616,901 B2
(45) Date of Patent: May 5, 2026

(54) MAPPING TRAVERSABLE SPACE IN A SCENE USING A THREE-DIMENSIONAL MESH

(71) Applicant: Niantic Spatial, Inc., San Francisco, CA (US)

(72) Inventors: Ádám Hegedüs, London (GB); Michael David Firman, London (GB); Aron Monszpart, London (GB); Gabriel J. Brostow, London (GB)

(73) Assignee: Niantic Spatial, Inc., San Francisco, CA (US)

( * ) Notice: Subject to any disclaimer, the term of this patent is extended or adjusted under 35 U.S.C. 154(b) by 573 days.

(21) Appl. No.: 18/117,339

(22) Filed: Mar. 3, 2023

(65) Prior Publication Data

US 2023/0277943 A1     Sep. 7, 2023

Related U.S. Application Data

(60) Provisional application No. 63/316,325, filed on Mar. 3, 2022, provisional application No. 63/345,420, filed on May 24, 2022.

(51) Int. Cl.
*A63F 13/655*     (2014.01)
*A63F 13/216*     (2014.01)
(Continued)

(52) U.S. Cl.
CPC .......... *A63F 13/655* (2014.09); *A63F 13/216* (2014.09); *A63F 13/52* (2014.09); *G06T 17/20* (2013.01)

(58) Field of Classification Search
CPC ...... A63F 13/655; A63F 13/216; A63F 13/52; A63F 13/63; A63F 13/65; A63F 13/213; G06T 17/20
See application file for complete search history.

(56) References Cited

U.S. PATENT DOCUMENTS 10,832,427 B1 *  11/2020  Eble ................... G02B 27/0093
10,885,710 B2     1/2021  Holz et al.
(Continued)

FOREIGN PATENT DOCUMENTS

WO     WO 2020-211990 A1     10/2020

OTHER PUBLICATIONS

PCT International Search Report and Written Opinion, PCT Application No. PCT/IB2023/052017, Jun. 2, 2023, 9 pages.
(Continued)

*Primary Examiner* — James S. McClellan
(74) *Attorney, Agent, or Firm* — Fenwick & West LLP

(57) ABSTRACT

A parallel-reality game uses a virtual game board having tiles placed over an identified traversable space corresponding to flat regions of a scene. A game board generation module receives one or more images of the scene captured by a camera of a mobile device. The game board generation module obtains a topographical mesh of the scene based on the received one or more images. The game board generation module then identifies a traversable space within the scene based on the obtained topographical mesh. The game board generation module determines a location for each of a set of polygon tiles in the identified traversable space. The game board generation module also allows for queries to identify parts of the game board that meet one or more provided criterion.

19 Claims, 12 Drawing Sheets

(51) Int. Cl.

| | |
|---|---|
| *A63F 13/52* | (2014.01) |
| *G06T 17/20* | (2006.01) |

(56) References Cited

U.S. PATENT DOCUMENTS

| | | | | |
|---|---|---|---|---|
| 11,804,012 | B1 * | 10/2023 | Kovacs | A63F 13/65 |
| 2016/0148433 | A1 | 5/2016 | Petrovskaya et al. | |
| 2016/0247320 | A1 | 8/2016 | Yuen et al. | |
| 2018/0240595 | A1 * | 8/2018 | Shimura | H01G 4/228 |
| 2018/0250595 | A1 * | 9/2018 | Kurabayashi | A63F 13/55 |
| 2020/0226823 | A1 | 7/2020 | Stachniak et al. | |
| 2020/0346117 | A1 * | 11/2020 | Barry | A63F 13/65 |
| 2021/0104100 | A1 * | 4/2021 | Whitney | G06T 13/40 |
| 2021/0166459 | A1 * | 6/2021 | Miller, IV | G06F 1/1637 |
| 2021/0217209 | A1 | 7/2021 | Elder et al. | |
| 2021/0248826 | A1 | 8/2021 | Shriram et al. | |
| 2022/0092681 | A1 * | 3/2022 | Haapoja | G06Q 30/0281 |
| 2023/0021433 | A1 * | 1/2023 | Sarria, Jr. | G06N 20/00 |
| 2023/0259194 | A1 * | 8/2023 | Geisert | G02B 27/0101 |
| | | | | 345/633 |

OTHER PUBLICATIONS

Niantic, Inc., "Lightship ARDK," May 11, 2021, 7 pages, [Online] [Retrieved on May 30, 2023] Retrieved from the Internet <URL: https://web.archive.org/web/20210511135553/https:/niantic.dev/products/ardk/>.

Alonso, E. et al., "Deep Reinforcement Learning for Navigation in AAA Video Games", Proceedings of the Thirtieth International Joint Conference on Artificial Intelligence, Aug. 1, 2021, pp. 2133-2139.

European Patent Office, Extended European Search Report and Opinion, European Patent Application No. 11852049.3, Jun. 3, 2014, six pages.

Watson, J. et al., "Footprints and Free Space From a Single Color Image", 2020 IEEE/CVF Conference on Computer Vision and Pattern Recognition (CVPR), Jun. 13, 2020, pp. 11-20.

Yang, X. et al., "Mobile3DRecon: Real-time Monocular 3D Reconstruction on a Mobile Phone", IEEE Transactions on Visualization and Computer Graphics, vol. 26, No. 12, Sep. 21, 2020, pp. 3446-3456.

* cited by examiner

100

400

500

Receive one or more images of a scene
510

Receive a mesh of the scene based on the image
520

Identify traversable space within the scene based on the mesh
530

Place polygon tiles in the identified traversable space
540

Assign properties to each polygon tile placed in the traversable space
550

700A

700B

700C

900

Identify a location of the player
910

Determine topology around player
920

Generate game board based on determined topology
around player
930

Identify region outside of gameboard to expand into
940

Receive information about region outside of game board
950

Expand game board based on received information
about the region outside of gameboard
960

MAPPING TRAVERSABLE SPACE IN A SCENE USING A THREE-DIMENSIONAL MESH

CROSS-REFERENCE TO RELATED APPLICATIONS

This application claims the benefit of U.S. Provisional Patent No. 63/316,325, filed on Mar. 3, 2022, and U.S. Provisional Patent No. 63/345,420, filed on May 24, 2022, which are incorporated by reference.

BACKGROUND

1. Technical Field

The subject matter described relates generally to augmented reality, and in particular, to building a game board that corresponds to real-world geography.

2. Problem

Location-based games use the real world as their geography. Parallel reality games are a type of location-based game that use a virtual world that parallels the real-world geography. The parallel virtual world may span the entire real world, or may span a bounded area around a mobile device used to play the game. Parallel reality games that are played in a bounded area around a mobile device may set up the bounded area by asking the player to manually define the bounded area. For example, the game may ask the player to walk around the desired boundary of the game to allow the game to identify where to place the edges of the play area. However, it would be advantageous to enable the parallel reality games to automatically detect and set up the play area.

The figures and the following description describe certain embodiments by way of illustration only. One skilled in the art will readily recognize from the following description that alternative embodiments of the structures and methods may be employed without departing from the principles described. Reference will now be made to several embodiments, examples of which are illustrated in the accompanying figures.

DETAILED DESCRIPTION

Exemplary Location-Based Parallel Reality Gaming System

Various embodiments are described in the context of a parallel reality game that includes augmented reality content in a virtual world geography that parallels at least a portion of the real-world geography such that player movement and actions in the real-world affect actions in the virtual world and vice versa. Those of ordinary skill in the art, using the disclosures provided herein, will understand that the subject matter described is applicable in other situations where determining a substantially flat and usable surface area within an image is desirable. In addition, the inherent flexibility of computer-based systems allows for a great variety of possible configurations, combinations, and divisions of tasks and functionality between and among the components of the system. For instance, the systems and methods according to aspects of the present disclosure can be implemented using a single computing device or across multiple computing devices (e.g., connected in a computer network).

Figure 1:
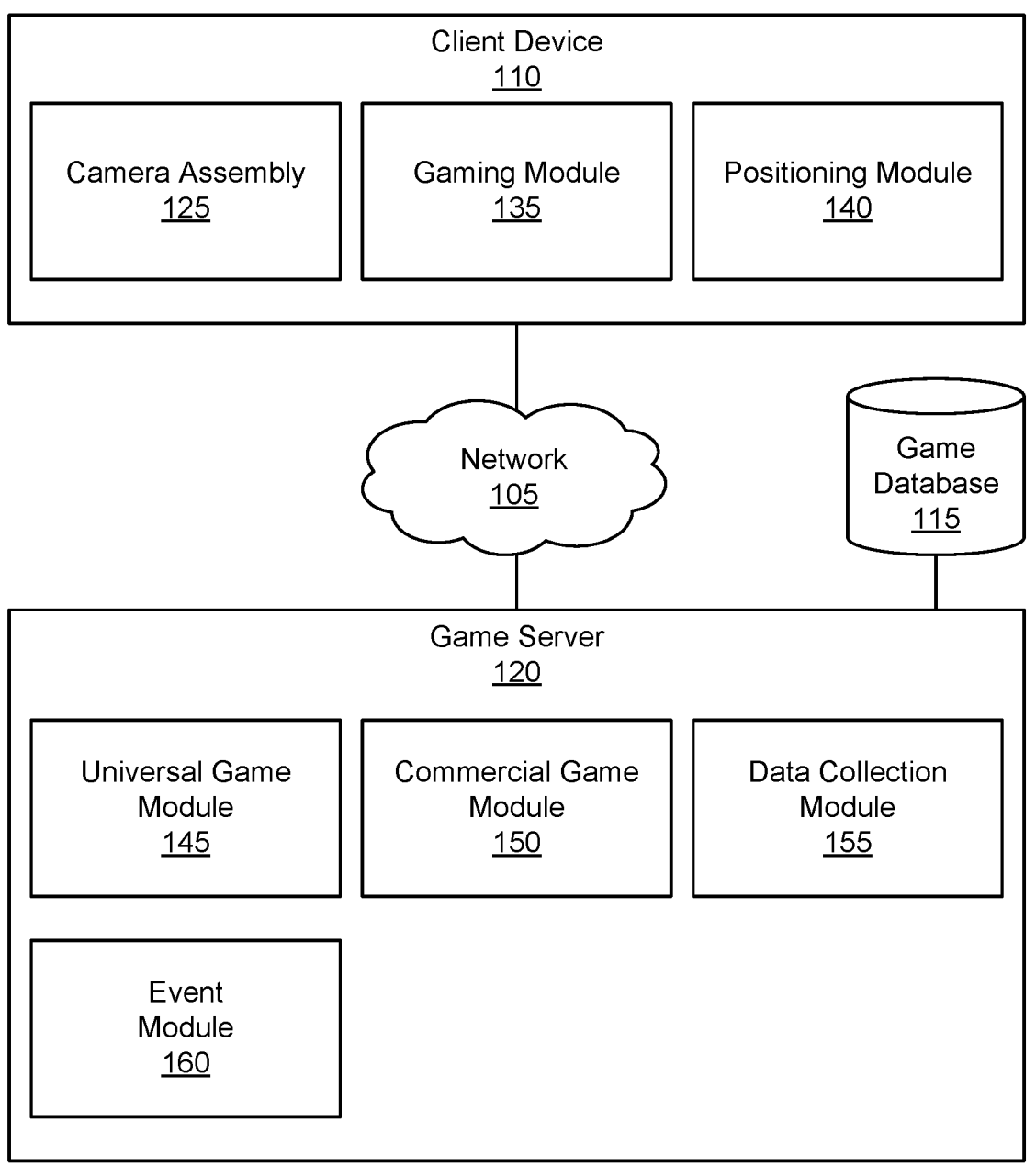
FIG. 1 illustrates a networked computing environment, in accordance with one or more embodiments.

FIG. 1 illustrates a networked computing environment 100, in accordance with one or more embodiments. The networked computing environment 100 provides for the interaction of players in a virtual world having a geography that parallels the real world. In particular, a geographic area in the real world can be linked or mapped directly to a corresponding area in the virtual world. A player can move about in the virtual world by moving to various geographic locations in the real world. For instance, a player's position in the real world can be tracked and used to update the player's position in the virtual world. Typically, the player's position in the real world is determined by finding the location of a client device 110 through which the player is interacting with the virtual world and assuming the player is at the same (or approximately the same) location. For example, in various embodiments, the player may interact with a virtual element if the player's location in the real world is within a threshold distance (e.g., ten meters, twenty meters, etc.) of the real-world location that corresponds to the virtual location of the virtual element in the virtual world. For convenience, various embodiments are described with reference to "the player's location" but one of skill in the art will appreciate that such references may refer to the location of the player's client device 110.

Figure 2:
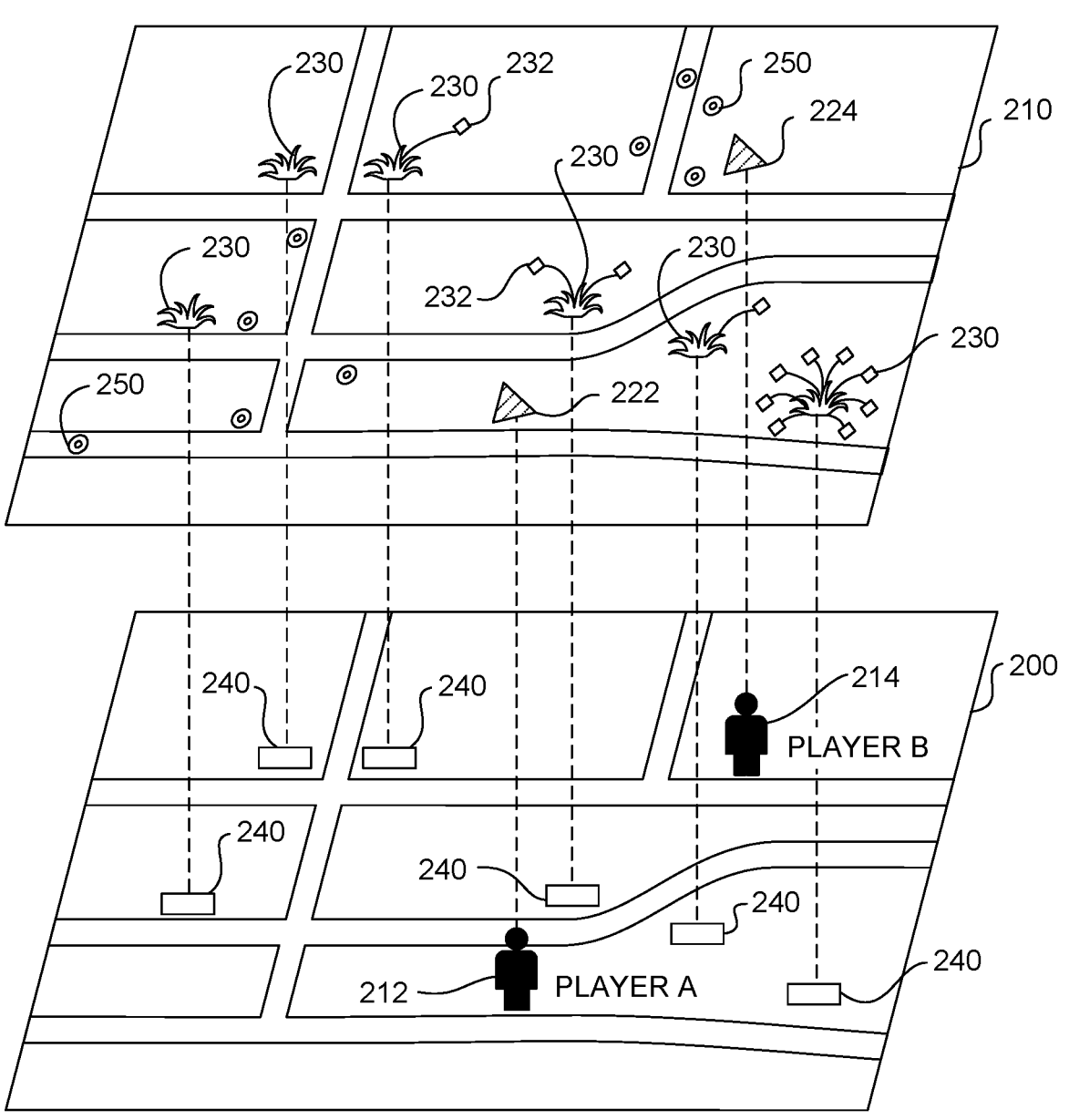
FIG. 2 depicts a representation of a virtual world having a geography that parallels the real world, in accordance with one or more embodiments.

Reference is now made to FIG. 2 which depicts a conceptual diagram of a virtual world 210 that parallels the real world 200 that can act as the game board for players of a parallel reality game, according to one or more embodiments. As illustrated, the virtual world 210 can include a geography that parallels the geography of the real world 200. In particular, a range of coordinates defining a geographic area or space in the real world 200 is mapped to a corresponding range of coordinates defining a virtual space in the virtual world 210. The range of coordinates in the real world 200 can be associated with a town, neighborhood, city, campus, locale, a country, continent, the entire globe, or other geographic area. Each geographic coordinate in the range of geographic coordinates is mapped to a corresponding coordinate in a virtual space in the virtual world.

A player's position in the virtual world 210 corresponds to the player's position in the real world 200. For instance, the player A located at position 212 in the real world 200 has a corresponding position 222 in the virtual world 210. Similarly, the player B located at position 214 in the real world has a corresponding position 224 in the virtual world. As the players move about in a range of geographic coordinates in the real world, the players also move about in the range of coordinates defining the virtual space in the virtual world 210. In particular, a positioning system (e.g., a GPS system) associated with a mobile computing device carried by the player can be used to track a player's position as the player navigates the range of geographic coordinates in the real world. Data associated with the player's position in the real world 200 is used to update the player's position in the corresponding range of coordinates defining the virtual space in the virtual world 210. In this manner, players can navigate along a continuous track in the range of coordinates defining the virtual space in the virtual world 210 by simply traveling among the corresponding range of geographic coordinates in the real world 200 without having to check in or periodically update location information at specific discrete locations in the real world 200.

The location-based game can include a plurality of game objectives requiring players to travel to and/or interact with various virtual elements and/or virtual objects scattered at various virtual locations in the virtual world. A player can travel to these virtual locations by traveling to the corresponding location of the virtual elements or objects in the real world. For instance, a positioning system can continuously track the position of the player such that as the player continuously navigates the real world, the player also continuously navigates the parallel virtual world. The player can then interact with various virtual elements and/or objects at the specific location to achieve or perform one or more game objectives.

For example, a game objective has players interacting with virtual elements 230 located at various virtual locations in the virtual world 210. These virtual elements 230 can be linked to landmarks, geographic locations, or objects 240 in the real world 200. The real-world landmarks or objects 240 can be works of art, monuments, buildings, businesses, libraries, museums, or other suitable real-world landmarks or objects. Interactions include capturing, claiming ownership of, using some virtual item, spending some virtual currency, etc. To capture these virtual elements 230, a player must travel to the landmark or geographic location 240 linked to the virtual elements 230 in the real world and must perform any necessary interactions with the virtual elements 230 in the virtual world 210. For example, player A of FIG. 2 may have to travel to a landmark 240 in the real world 200 to interact with or capture a virtual element 230 linked with that particular landmark 240. The interaction with the virtual element 230 can require action in the real world, such as taking a photograph and/or verifying, obtaining, or capturing other information about the landmark or object 240 associated with the virtual element 230.

Game objectives may require that players use one or more virtual items that are collected by the players in the location-based game. For instance, the players may travel the virtual world 210 seeking virtual items (e.g., weapons, creatures, power ups, or other items) that can be useful for completing game objectives. These virtual items can be found or collected by traveling to different locations in the real world 200 or by completing various actions in either the virtual world 210 or the real world 200. In the example shown in FIG. 2, a player uses virtual items 232 to capture one or more virtual elements 230. In particular, a player can deploy virtual items 232 at locations in the virtual world 210 proximate or within the virtual elements 230. Deploying one or more virtual items 232 in this manner can result in the capture of the virtual element 230 for the particular player or for the team/faction of the particular player.

In one implementation, a player may have to gather virtual energy as part of the parallel reality game. As depicted in FIG. 2, virtual energy 250 can be scattered at different locations in the virtual world 210. A player can collect the virtual energy 250 by traveling to the corresponding location of the virtual energy 250 in the actual world 200. The virtual energy 250 can be used to power virtual items and/or to perform various game objectives in the game. A player that loses all virtual energy 250 can be disconnected from the game.

According to aspects of the present disclosure, the parallel reality game can be a massive multi-player location-based game where every participant in the game shares the same virtual world. The players can be divided into separate teams or factions and can work together to achieve one or more game objectives, such as to capture or claim ownership of a virtual element. In this manner, the parallel reality game can intrinsically be a social game that encourages cooperation among players within the game. Players from opposing teams can work against each other (or sometime collaborate to achieve mutual objectives) during the parallel reality game. A player may use virtual items to attack or impede progress of players on opposing teams. In some cases, players are encouraged to congregate at real world locations for cooperative or interactive events in the parallel reality game. In these cases, the game server seeks to ensure players are indeed physically present and not spoofing.

The parallel reality game can have various features to enhance and encourage game play within the parallel reality game. For instance, players can accumulate a virtual currency or another virtual reward (e.g., virtual tokens, virtual points, virtual material resources, etc.) that can be used throughout the game (e.g., to purchase in-game items, to redeem other items, to craft items, etc.). Players can advance through various levels as the players complete one or more game objectives and gain experience within the game. In some embodiments, players can communicate with one another through one or more communication interfaces provided in the game. Players can also obtain enhanced "powers" or virtual items that can be used to complete game objectives within the game. Those of ordinary skill in the art, using the disclosures provided herein, should understand that various other game features can be included with the parallel reality game without deviating from the scope of the present disclosure.

Referring back FIG. 1, the networked computing environment 100 uses a client-server architecture, where a game server 120 communicates with a client device 110 over a network 105 to provide a parallel reality game to players at the client device 110. The networked computing environment 100 also may include other external systems such as sponsor/advertiser systems or business systems. Although only one client device 110 is illustrated in FIG. 1, any number of clients 110 or other external systems may be connected to the game server 120 over the network 105. Furthermore, the networked computing environment 100 may contain different or additional elements and functionality may be distributed between the client device 110 and the server 120 in a different manner than described below.

A client device 110 can be any portable computing device that can be used by a player to interface with the game server 120. For instance, a client device 110 can be a wireless device, a personal digital assistant (PDA), portable gaming device, cellular phone, smart phone, tablet, navigation system, handheld GPS system, wearable computing device, a display having one or more processors, or other such device. In another instance, the client device 110 includes a conventional computer system, such as a desktop or a laptop computer. Still yet, the client device 110 may be a vehicle with a computing device. In short, a client device 110 can be any computer device or system that can enable a player to interact with the game server 120. As a computing device, the client device 110 can include one or more processors and one or more computer-readable storage media. The computer-readable storage media can store instructions which cause the processor to perform operations. The client device 110 is preferably a portable computing device that can be easily carried or otherwise transported with a player, such as a smartphone or tablet.

The client device 110 communicates with the game server 120 providing the game server 120 with sensory data of a physical environment. The client device 110 includes a camera assembly 125 that captures image data in two dimensions of a scene in the physical environment where the client device 110 is. In the embodiment shown in FIG. 1, each client device 110 includes software components such as a gaming module 135 and a positioning module 140. The client device 110 may include various other input/output devices for receiving information from and/or providing information to a player. Example input/output devices include a display screen, a touch screen, a touch pad, data entry keys, speakers, and a microphone suitable for voice recognition. The client device 110 may also include other various sensors for recording data from the client device 110 including but not limited to movement sensors, accelerometers, gyroscopes, other inertial measurement units (IMUs), barometers, positioning systems, thermometers, light sensors, etc. The client device 110 can further include a network interface for providing communications over the network 105. A network interface can include any suitable components for interfacing with one or more networks, including for example, transmitters, receivers, ports, controllers, antennas, or other suitable components.

The camera assembly 125 captures image data of a scene of the environment where the client device 110 is in. The camera assembly 125 may utilize a variety of varying photo sensors with varying color capture ranges at varying capture rates. The camera assembly 125 may contain a wide-angle lens or a telephoto lens. The camera assembly 125 may be configured to capture single images or video as the image data. Additionally, the orientation of the camera assembly 125 could be parallel to the ground with the camera assembly 125 aimed at the horizon. The camera assembly 125 captures image data and shares the image data with the computing device on the client device 110. The image data can be appended with metadata describing other details of the image data including sensory data (e.g., temperature, brightness of environment) or capture data (e.g., exposure, warmth, shutter speed, focal length, capture time, etc.). The camera assembly 125 can include one or more cameras which can capture image data. In one instance, the camera assembly 125 comprises one camera and is configured to capture monocular image data. In another instance, the camera assembly 125 comprises two cameras and is configured to capture stereoscopic image data. In various other implementations, the camera assembly 125 comprises a plurality of cameras each configured to capture image data.

The gaming module 135 provides a player with an interface to participate in the parallel reality game. The game server 120 transmits game data over the network 105 to the client device 110 for use by the gaming module 135 at the client device 110 to provide local versions of the game to players at locations remote from the game server 120. The game server 120 can include a network interface for providing communications over the network 105. A network interface can include any suitable components for interfacing with one or more networks, including for example, transmitters, receivers, ports, controllers, antennas, or other suitable components.

The gaming module 135 executed by the client device 110 provides an interface between a player and the parallel reality game. The gaming module 135 can present a user interface on a display device associated with the client device 110 that displays a virtual world (e.g., renders imagery of the virtual world) associated with the game and allows a user to interact in the virtual world to perform various game objectives. In some other embodiments, the gaming module 135 presents image data from the real world (e.g., captured by the camera assembly 125) augmented with virtual elements from the parallel reality game. In these embodiments, the gaming module 135 may generate virtual content and/or adjust virtual content according to other information received from other components of the client device 110. For example, the gaming module 135 may adjust a virtual object to be displayed on the user interface according to a depth map of the scene captured in the image data. In other embodiments, such as where a headset is used, the gaming module 135 may cause just the virtual elements to be displayed on a transparent or semi-transparent display such that the user perceives the virtual elements as being overlaid on their view of the real world.

The gaming module 135 can also control various other outputs to allow a player to interact with the game without requiring the player to view a display screen. For instance, the gaming module 135 can control various audio, vibratory, or other notifications that allow the player to play the game without looking at the display screen. The gaming module 135 can access game data received from the game server 120 to provide an accurate representation of the game to the user. The gaming module 135 can receive and process player input and provide updates to the game server 120 over the network 105. The gaming module 135 may also generate and/or adjust game content to be displayed by the client device 110. For example, the gaming module 135 may generate a virtual element based on a comparison of depth information and one or more topographical meshes representing the real-world environment around the client device 110.

The positioning module 140 can be any device or circuitry for monitoring the position of the client device 110. For example, the positioning module 140 can determine actual or relative position by using a satellite navigation positioning system (e.g. a GPS system, a Galileo positioning system, the Global Navigation satellite system (GLONASS), the BeiDou Satellite Navigation and Positioning system), an inertial navigation system, a dead reckoning system, based on IP address, by using triangulation and/or proximity to cellular towers or Wi-Fi hotspots, and/or other suitable techniques for determining position. The positioning module 140 may further include various other sensors that may aid in accurately positioning the client device 110 location.

As the player moves around with the client device 110 in the real world, the positioning module 140 tracks the position of the player and provides the player position information to the gaming module 135. The gaming module 135 updates the player position in the virtual world associated with the game based on the actual position of the player in the real world. Thus, a player can interact with the virtual world simply by carrying or transporting the client device 110 in the real world. In particular, the location of the player in the virtual world can correspond to the location of the player in the real world. The gaming module 135 can provide player position information to the game server 120 over the network 105. In response, the game server 120 may enact various techniques to verify the client device 110 location to prevent cheaters from spoofing the client device 110 location. It should be understood that location information associated with a player is utilized only if permission is granted after the player has been notified that location information of the player is to be accessed and how the location information is to be utilized in the context of the game (e.g., to update player position in the virtual world). In addition, any location information associated with players will be stored and maintained in a manner to protect player privacy.

The game server 120 can be any computing device and can include one or more processors and one or more computer-readable storage media. The computer-readable storage media can store instructions which cause the processor to perform operations. The game server 120 can include or can be in communication with a game database 115. The game database 115 stores game data used in the parallel reality game to be served or provided to the client(s) 120 over the network 105.

The game data stored in the game database 115 can include: (1) data associated with the virtual world in the parallel reality game (e.g. imagery data used to render the virtual world on a display device, geographic coordinates of locations in the virtual world, etc.); (2) data associated with players of the parallel reality game (e.g. player profiles including but not limited to player information, player experience level, player currency, current player positions in the virtual world/real world, player energy level, player preferences, team information, faction information, etc.); (3) data associated with game objectives (e.g. data associated with current game objectives, status of game objectives, past game objectives, future game objectives, desired game objectives, etc.); (4) data associated with virtual elements in the virtual world (e.g. positions of virtual elements, types of virtual elements, game objectives associated with virtual elements; corresponding actual world position information for virtual elements; behavior of virtual elements, relevance of virtual elements etc.); (5) data associated with real-world objects, landmarks, positions linked to virtual-world elements (e.g. location of real-world objects/landmarks, description of real-world objects/landmarks, relevance of virtual elements linked to real-world objects, etc.); (6) game status (e.g. current number of players, current status of game objectives, player leaderboard, etc.); (7) data associated with player actions/input (e.g. current player positions, past player positions, player moves, player input, player queries, player communications, etc.); and (8) any other data used, related to, or obtained during implementation of the parallel reality game. The game data stored in the game database 115 can be populated either offline or in real time by system administrators and/or by data received from users/players of the system 100, such as from a client device 110 over the network 105.

The game server 120 can be configured to receive requests for game data from a client device 110 (for instance via remote procedure calls (RPCs)) and to respond to those requests via the network 105. For instance, the game server 120 can encode game data in one or more data files and provide the data files to the client device 110. In addition, the game server 120 can be configured to receive game data (e.g., player positions, player actions, player input, etc.) from a client device 110 via the network 105. For instance, the client device 110 can be configured to periodically send player input and other updates to the game server 120, which the game server 120 uses to update game data in the game database 115 to reflect any and all changed conditions for the game.

In the embodiment shown, the game server 120 includes a universal gaming module 145, a commercial game module 150, a data collection module 155, an event module 160. As mentioned above, the game server 120 interacts with a game database 115 that may be part of the game server 120 or accessed remotely (e.g., the game database 115 may be a distributed database accessed via the network 105). In other embodiments, the game server 120 contains different and/or additional elements. For example, the game server 120 may include the topographical mesh management module 320, the semantic segmentation module 340, and/or the game board generation module 350. In addition, the functions may be distributed among the elements in a different manner than described. For instance, the game database 115 can be integrated into the game server 120.

The universal game module 145, in embodiments where one is included, hosts the parallel reality game for all players and acts as the authoritative source for the current status of the parallel reality game for all players. As the host, the universal game module 145 generates game content for presentation to players, e.g., via their respective client devices 110. The universal game module 145 may access the game database 115 to retrieve and/or store game data when hosting the parallel reality game. The universal game module 145 also receives game data from client device 110 (e.g., depth information, player input, player position, player actions, landmark information, etc.) and incorporates the game data received into the overall parallel reality game for all players of the parallel reality game. The universal game module 145 can also manage the delivery of game data to the client device 110 over the network 105. The universal game module 145 may also govern security aspects of client device 110 including but not limited to securing connections between the client device 110 and the game server 120, establishing connections between various client device 110, and verifying the location of the various client device 110.

The commercial game module 150, in embodiments where one is included, can be separate from or a part of the universal game module 145. The commercial game module 150 can manage the inclusion of various game features within the parallel reality game that are linked with a commercial activity in the real world. For instance, the commercial game module 150 can receive requests from external systems such as sponsors/advertisers, businesses, or other entities over the network 105 (via a network interface)

to include game features linked with commercial activity in the parallel reality game. The commercial game module 150 can then arrange for the inclusion of these game features in the parallel reality game.

The game server 120 can further include a data collection module 155. The data collection module 155, in embodiments where one is included, can be separate from or a part of the universal game module 145. The data collection module 155 can manage the inclusion of various game features within the parallel reality game that are linked with a data collection activity in the real world. For instance, the data collection module 155 can modify game data stored in the game database 115 to include game features linked with data collection activity in the parallel reality game. The data collection module 155 can also analyze and data collected by players pursuant to the data collection activity and provide the data for access by various platforms.

The event module 160 manages player access to events in the parallel reality game. Although the term "event" is used for convenience, it should be appreciated that this term need not refer to a specific event at a specific location or time. Rather, it may refer to any provision of access-controlled game content where one or more access criteria are used to determine whether players may access that content. Such content may be part of a larger parallel reality game that includes game content with less or no access control or may be a stand-alone, access controlled parallel reality game.

The network 105 can be any type of communications network, such as a local area network (e.g., intranet), wide area network (e.g., Internet), or some combination thereof. The network can also include a direct connection between a client device 110 and the game server 120. In general, communication between the game server 120 and a client device 110 can be carried via a network interface using any type of wired and/or wireless connection, using a variety of communication protocols (e.g., TCP/IP, HTTP, SMTP, FTP), encodings or formats (e.g., HTML, XML, JSON), and/or protection schemes (e.g., VPN, secure HTTP, SSL).

The technology discussed herein makes reference to servers, databases, software applications, and other computer-based systems, as well as actions taken and information sent to and from such systems. One of ordinary skill in the art will recognize that the inherent flexibility of computer-based systems allows for a great variety of possible configurations, combinations, and divisions of tasks and functionality between and among components. For instance, server processes discussed herein may be implemented using a single server or multiple servers working in combination. Databases and applications may be implemented on a single system or distributed across multiple systems. Distributed components may operate sequentially or in parallel.

Figure 3:
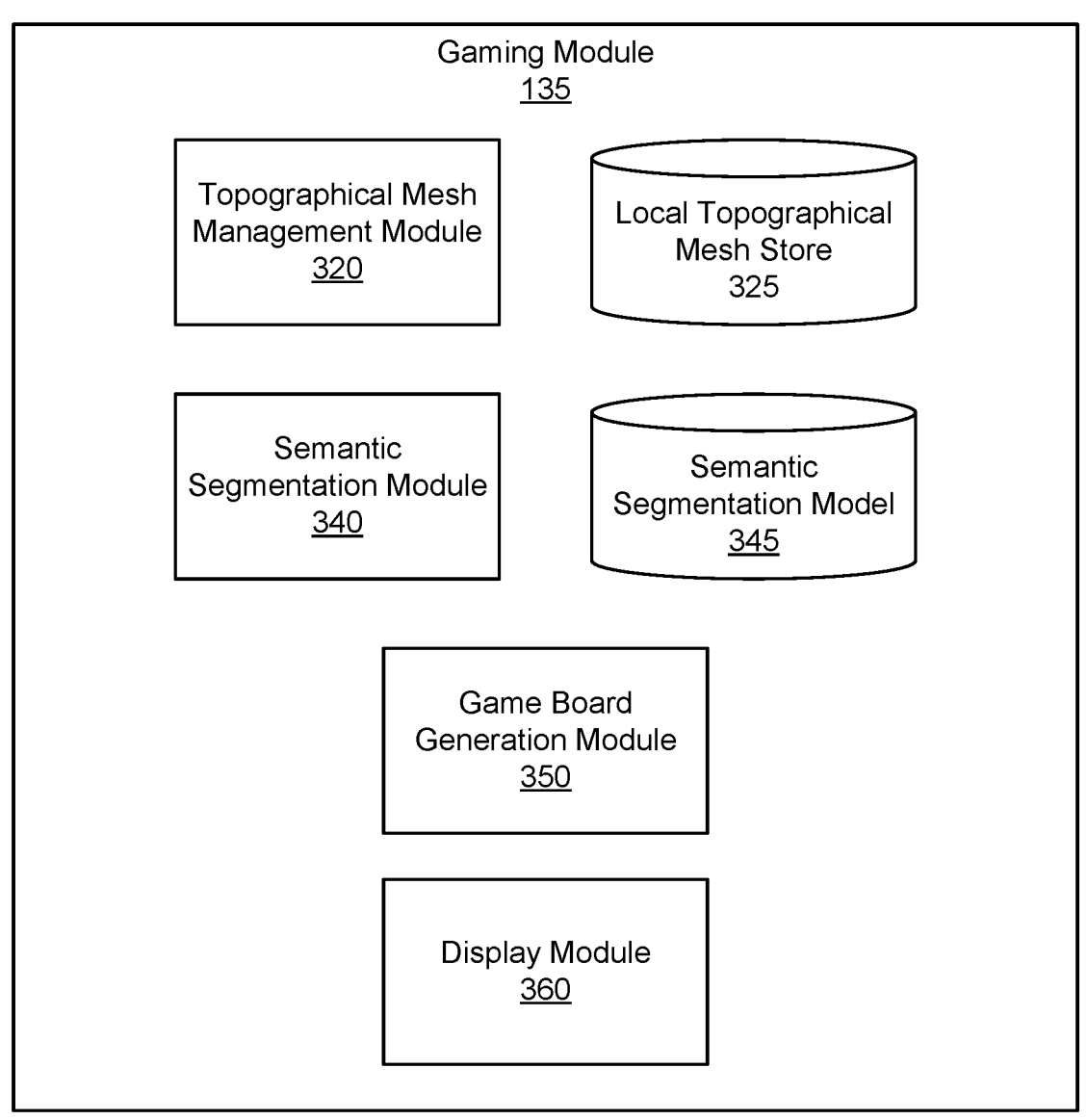
FIG. 3 illustrates a block diagram of the gaming module 135, according to one or more embodiments.

FIG. 3 illustrates one embodiment of the gaming module 135. In the embodiment shown, the gaming module 135 includes a topographical mesh management module 320, a local topographical mesh store 325, a semantic segmentation module 340, and a game board generation module 350. In other embodiments, the gaming module 135 includes additional or different components. Furthermore, the functionality described may be distributed among the components differently. For example, one or more components of the gaming module 135 shown in FIG. 3 may be included in the gaming server 120 instead.

The topographical mesh management module 320 manages topographical meshes for the gaming module 135. Topographical meshes are three-dimensional representations of an environment within the real-world and can include combinations of geometry (e.g., a polygon mesh), colors (e.g., RGB data), textures (e.g., texture maps, bump maps, etc.), other material properties (e.g., reflectance, friction, density, etc.), and other information describing the real-world environment. Alternatively, a topographical mesh may be purely geometric and other properties (e.g., segmentation data) may be stored separately and mapped to polygons of the topographical mesh.

Depending on the embodiment, topographical meshes may be generated (e.g., by a client device 110 or the game server 120) using processes requiring varying degrees of computational complexity and respectively producing topographical meshes which can be displayed with varying degrees of visual accuracy (e.g., resemblance to the real-world environment). For example, the geometry of the topographical meshes can be represented using high-density polygon meshes (e.g., high polygon count) which achieve at or near a one-to-one correspondence with the real-world environment. Furthermore, the topographical meshes used by the client devices 110 can include photo-realistic or near photo-realistic geometry and textures representing the real-world environment.

In some embodiments, the topographical mesh management module 320 uses scanning information describing a real-world environment around the client device 110 (e.g., provided by the camera assembly 125 or a sensor module) to generate a topographical mesh or uses a location of the client device 110 to retrieve a previously generated topographical mesh for the real-world environment. In embodiments where the topographical mesh management module 320 generates the mesh, the topographical mesh topographical mesh management module 320 uses scanning information captured from a scan of the real-world environment using one or more sensors managed by the sensor module 310. In embodiments where the topographical mesh management module 320 retrieves a previously generated topographical mesh, the topographical management module 310 identifies and retrieves the previously generated topographical mesh (e.g., from the local topographical mesh database 325, or from the gaming server 120) using a geographic position of the client device 110, scanning information, or other information.

The topographical mesh management module 320 can locally store topographical meshes generated by the client device 110, or otherwise obtained, in the local topographical mesh store 325. The client device 110 can use topographical meshes obtained by the topographical mesh management module 320 for relevant processes of the client device 110. For example, the topographical mesh management module 320 may determine a topographical mesh for a real-world environment was previously locally stored based on a scan of the real-world environment or a geographic position of the client device 110. In some embodiments, the topographical mesh management module 320 can provide topographical meshes to the game server 120 for storage. In some embodiments, the topographical mesh management module 320 can obtain topographical meshes or other information describing the real-world environment from the game server 120, such as topographical meshes stored at the game server 120 corresponding to a real-world environment where the client device 110 is located.

In some embodiments, the topographical mesh management module 320 coordinates collection of scanning information for the real-world environment using the client device 110 by the player associated with the client device 110. For instance, the topographical mesh management module 320 may provide a user interface for display on the client device 110 which displays scan-related information (i.e., a scanning interface), such as images of the real-world environment captured by the camera assembly 125. The scanning interface may include one or more interactable objects (e.g., virtual buttons) configured to control a state of the scanning process, such as interactable objects which initiate scanning, pause scanning, end scanning (e.g., in order to generate a topographical mesh using the collected scan-related information). The scanning interface may further include various visualizations of scan related information, such as visualizations of a portion of the topographical mesh generated during the scanning (e.g., the geometry of the topographical mesh) or depth information. Furthermore, the scanning interface may guide the player through the scanning process, such as by displaying messages or visual indicators describing portions of the real-world environment to scan or how much of the real-world environment to scan. In some embodiments, multiple client devices 110 concurrently coordinate collection of related topographical meshes by multiple respective users. For instance, the game server 120 may direct the multiple client devices to collect the topographical meshes. The topographical meshes collected by the multiple client devices 110 may be combined into a single topographical mesh. As such, the multiple client device 110 may generate respective topographical meshes to collectively map out a real-world environment.

In some embodiments, the topographical mesh management module 320 generates a topographical mesh using one or more mesh generation techniques. In particular, the topographical mesh generation module 320 can use scanning information to perform the one or more mesh generation techniques. The scanning information can be obtained directly by the client device 110 (e.g., one or more images captured by the camera assembly 125) or retrieved from another device or remote system (e.g., the game server 120). The topographical mesh management module 320 can use various computer vision techniques to obtain the scanning information or generate the topographical mesh, such as geometric computer vision techniques or machine learning-based computer vision techniques. For instance, using computer vision techniques, the topographical mesh management module 320 may determine depth information (e.g., a point cloud or dense depth image) describing the real-world environment. Furthermore, the topographical mesh management module 320 can process the scanning information using various mesh generation techniques, such as Delaunay triangulation, Ruppert's algorithm, advancing front algorithms, Poisson reconstruction, etc.

In some embodiments, the topographical mesh generation process used by the topographical mesh management module 320 generates a topographical mesh by combining new scanning information (e.g., collected by the client device 110) and previously collected scanning information (e.g., stored on the client device 110 or the gaming serve 120). In some embodiments, the topographical mesh management module 320 generates topographical meshes in real-time or near real-time. For example, the topographical mesh management module 320 may generate a topographical mesh corresponding to a portion of the real-world environment within milliseconds or seconds after the client device 110 captured or received scanning information for the real-world environment.

In some embodiments, the topographical mesh management module 320 determines location information for a real-world environment where the client device 110 is located. For instance, the topographical mesh management module 320 can determine the geographic position of the real-world environment based on a geographic position of the client device 110. Alternatively, or additionally, the topographical mesh management module 320 may determine the location of the client device 110 using data captured by one or more sensors by comparing the captured data to previously captured sensor data for the real-world environment. For example, the topographical mesh management module 320 may use various image recognition techniques to predict the location of the client device 110 from one or more images captured by a camera of the device.

In embodiments, the topographical mesh management module 320 uses the location information describing the real-world environment to determine if a previously generated topographical mesh for the real-world environment is stored locally or on the gaming server 120. For example, topographical meshes stored in the local topographical mesh store 325 or on the game server 120 may be stored in association with geographic positions and other location-related metadata (e.g., a description of the location, such as an address or location name). In some embodiments, the topographical mesh management module 320 uses the location information describing the real-world environment in order to retrieve other data associated with the real-world location, such as scanning information stored by the client device 110 or the game server 120.

If the topographical mesh management module 320 requests topographical meshes from the game server 120 based on location information, the game server 120 may determine whether the client device 110 is authorized to access some or all of the stored topographical meshes associated with the location information. For instance, some topographical meshes stored by the game server 120 representing public environments (e.g., parks, entertainment venues, etc.) may be publicly accessible to any of the client devices 110. Other topographical meshes stored on the game server 120 may be accessible only to authorized client devices 110, such as topographical meshes representing private environments (e.g., a player's home) or designated as private by the client device 110 when providing the topographical mesh to the game server 120.

In some embodiments, the topographical mesh management module 320 dynamically combines some or all of multiple topographical meshes for relevant processes of the client device 110. In these embodiments, the topographical mesh management module 320 can combine topographical meshes obtained from one or more sources, such as generated by the client device 110, retrieved from the local topographical mesh store 325, or retrieved from the game server 120. For example, the topographical mesh management module 320 may generate a topographical mesh representing an indoor space where the client device 110 is located, such as a house, by retrieving one or more previously generated topographical meshes representing a first portion of the indoor space (e.g., the living room, the dining room, etc.) and generating a new topographical mesh for second portion of the indoor space to generate one or more other topographical meshes representing portions of the indoor space. Topographical meshes retrieved by the topographical mesh management module 320 (e.g., to combine) may be generated by the client device 110 or other client devices 110 concurrently or within a time interval.

The topographical mesh management module 320 may combine (e.g., stitch) the one or more retrieved or generated topographical meshes and provide the combined topographical meshes to other components of the gaming module 135 to use for displaying AR content. The combined one or more topographical meshes can be entirely generated by the client device 110 or crowdsourced from multiple client devices 110, such as via the network 130. In some embodiments, the topographical mesh management module 320 generates or retrieves topographical meshes as the location of the client device 110 changes. For example, the topographical mesh management module 320 may retrieve or generate a topographical mesh representing a room of an indoor space after determining the client device 110 has entered the room.

The local topographical mesh store 325 includes one or more computer-readable media configured to store information describing topographical meshes. The information stored by the local topographical mesh store 325 may be retrieved or generated by the topographical mesh management module 320 or otherwise or otherwise obtained or determined by the client device 110. The local topographical mesh data store 325 can additionally, or alternatively, store other information describing real-world environments, such as scanning or location information associated with real-world environments and obtained by the client device 110.

The semantic segmentation module 340 uses the semantic segmentation model 345 to match regions of an image to objects or semantics the semantic segmentation model 345 is trained to recognize. Upon training, the semantic segmentation model 345 is configured to predict properties associated with objects represented by one or more pixels of an image. For example, the semantic segmentation model 345 is a machine learned model trained to recognize types of surfaces for objects represented in an image based on a training data set with images of various surfaces having different properties. In some embodiments, the semantic segmentation model 345 is trained to recognize a material associated with a surface. For example, the semantic segmentation model 345 is trained to recognize whether a surface is made of concrete, wood, grass, water, snow, etc.

In some embodiments, the semantic segmentation module 340 receives a topographical mesh from the topographical mesh management module 320 and predicts one or more properties for each polygon cell in the topographical mesh. For example, the semantic segmentation module 340 predicts a material associated with each polygon cell of the received topographical mesh. The semantic segmentation module 340 may predict the property associated with each polygon cell using the images used to generate the topographical mesh. For instance, the semantic segmentation module 340 may additionally receive the one or more images used by the topographical mesh management module 320 to generate the topographical mesh and predicts the property associated with each of the polygon cells in the topographical mesh.

The game board generation module 350 receives a topographical mesh and determines a placement for a set of tiles within the topographical mesh. In some embodiments, the game board generation module 350 places polygon tiles within the received topographical mesh. The polygon tiles placed by the game board generation module 350 may all be of identical shape and size. For example, the game board generation module 350 places square or hexagonal tiles having a set dimension within the received topographical mesh.

In some embodiments, the game board generation module 350 identifies a traversable space within the received mesh and determines a placement of the polygon tiles within the identified traversable space. A detailed description of an example process for determining the placement of polygon tiles within a traversable space is provided below in conjunction with FIG. 5.

The gaming module 135 may generate AR objects that interact with (e.g., are positioned by or move according to)

topographical meshes of the real-world environment around the client device 110 and/or the tiles placed by the game board generation module 350. In some embodiments, the display module 360 simulates a custom view of the real-world environment by providing an AR interface for display by the client device 110. The AR interface can include virtual objects in the three-dimensional space, for which the location of the virtual objects (e.g., AR objects) in the three-dimensional space is determined using a generated topographical mesh of the three-dimensional space. For example, the AR objects may be displayed interacting with real-world objects represented by the one or more topographical mesh (e.g., a table, chair, floor, ceiling, wall, etc.). The display module 360 may display the AR objects laid over captured images from the camera assembly 125 or display the AR objects alone.

In some embodiments, the AR interface is associated with a parallel reality game hosted by the game server 120. In this case, the AR objects displayed may be interactive game objects (e.g., game buttons, game items, etc.), a game board, game characters (e.g., a game character controllable by the player), game effects, or any other AR content of the parallel reality game. In other embodiments, the virtual objects may be displayed with some transparency or selectivity, such that the user may view the real world through the virtual objects. In one embodiment, the display module 360 may display a representation of the topographical mesh to allows the user to view the game board generated for a position other than the user's current position.

In addition, in situations in which the systems and methods discussed herein access and analyze personal information about users, or make use of personal information, such as location information, the users may be provided with an opportunity to control whether programs or features collect the information and control whether and/or how to receive content from the system or other application. No such information or data is collected or used until the user has been provided meaningful notice of what information is to be collected and how the information is used. The information is not collected or used unless the user provides consent, which can be revoked or modified by the user at any time. Thus, the user can have control over how information is collected about the user and used by the application or system. In addition, certain information or data can be treated in one or more ways before it is stored or used, so that personally identifiable information is removed. For example, a user's identity may be treated so that no personally identifiable information can be determined for the user.

Exemplary Game Interface

Figure 4:
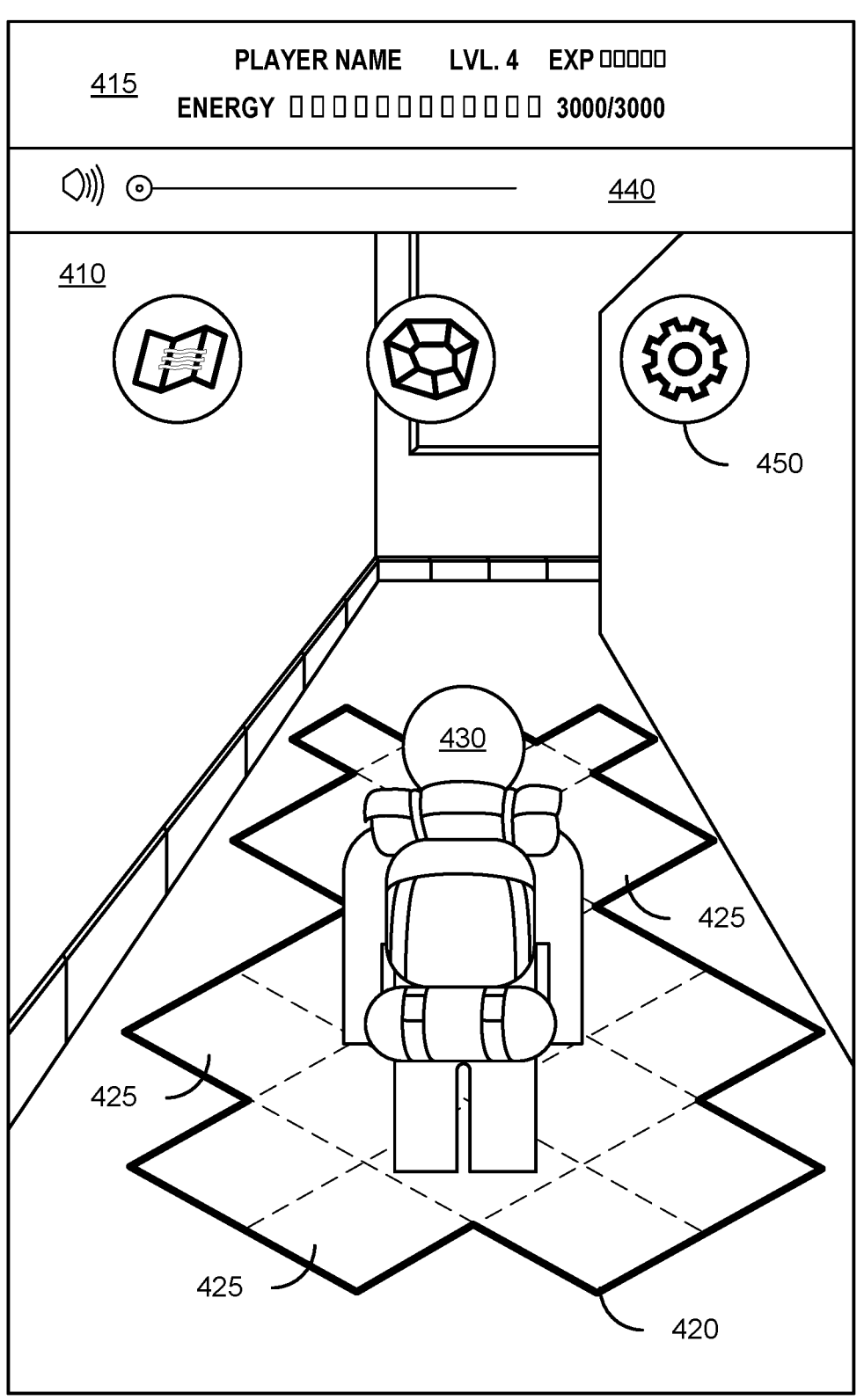
FIG. 4 depicts an exemplary game interface of a parallel reality game that can be presented on a display of a client device as part of the interface between a player and a virtual world or a parallel reality world, in accordance with one or more embodiments.

FIG. 4 depicts an exemplary game interface 400 of a parallel reality game that can be presented on a display of a client device 110 as part of the interface between a player and a virtual world (such as the virtual world 210 of FIG. 2) or a parallel reality world, in accordance with one or more embodiments. The game interface includes a display window 410 that can be used to display the virtual world and various aspects of the game, such as the location of virtual items. For example, the display window 410 displays a game board 420 having multiple tiles 425. In the example of FIG. 4, the tiles are polygon tiles. Specifically, the tiles 425 of the game board 420 are square tiles. However, any other shape of tiles (such as triangular tiles or hexagonal tiles) may be used. In some embodiments, only shapes that can tile the plane may be used to generate the game board 420. Moreover, the display window 410 displays one or more virtual objects or virtual characters 430. The virtual objects or virtual characters 430 may be placed within one or more tiles 425 of the game board 420.

The user interface 400 can also display other information, such as game data information, game communications, player information, client location verification instructions and other information associated with the game. For example, the user interface 400 can display player information 415, such as player name, experience level and other information. The user interface 400 can include a menu 450 for accessing various game settings and other information associated with the game. The user interface 400 can also include a communications interface that enables communications between the game system and the player and between one or more players of the parallel reality game.

According to aspects of the present disclosure, a player can interact with the parallel reality game by simply carrying a client device 110 around in the real world. For instance, a player can play the game by simply accessing an application associated with the parallel reality game on a smartphone and moving about in the real world with the smartphone. In this regard, it is not necessary for the player to continuously view a visual representation of the virtual world on a display screen to play the location-based game. As a result, the user interface 400 can include a plurality of non-visual elements that allow a user/player to interact with the game. For instance, the game interface can provide audible notifications to the player when the player is approaching a virtual element or object in the game or when an important event happens in the parallel reality game. A player can control these audible notifications with audio control 440. Different types of audible notifications can be provided to the user/player depending on the type of virtual element or event. The audible notification can increase or decrease in frequency or volume depending on a player's proximity to a virtual element or object. Other non-visual notifications and signals can be provided to the user/player, such as a vibratory notification or other suitable notifications or signals.

Those of ordinary skill in the art, using the disclosures provided herein, will appreciate that numerous game interface configurations and underlying functionalities will be apparent in light of this disclosure. The present disclosure is not intended to be limited to any one particular configuration.

Exemplary Methods

Figure 5:
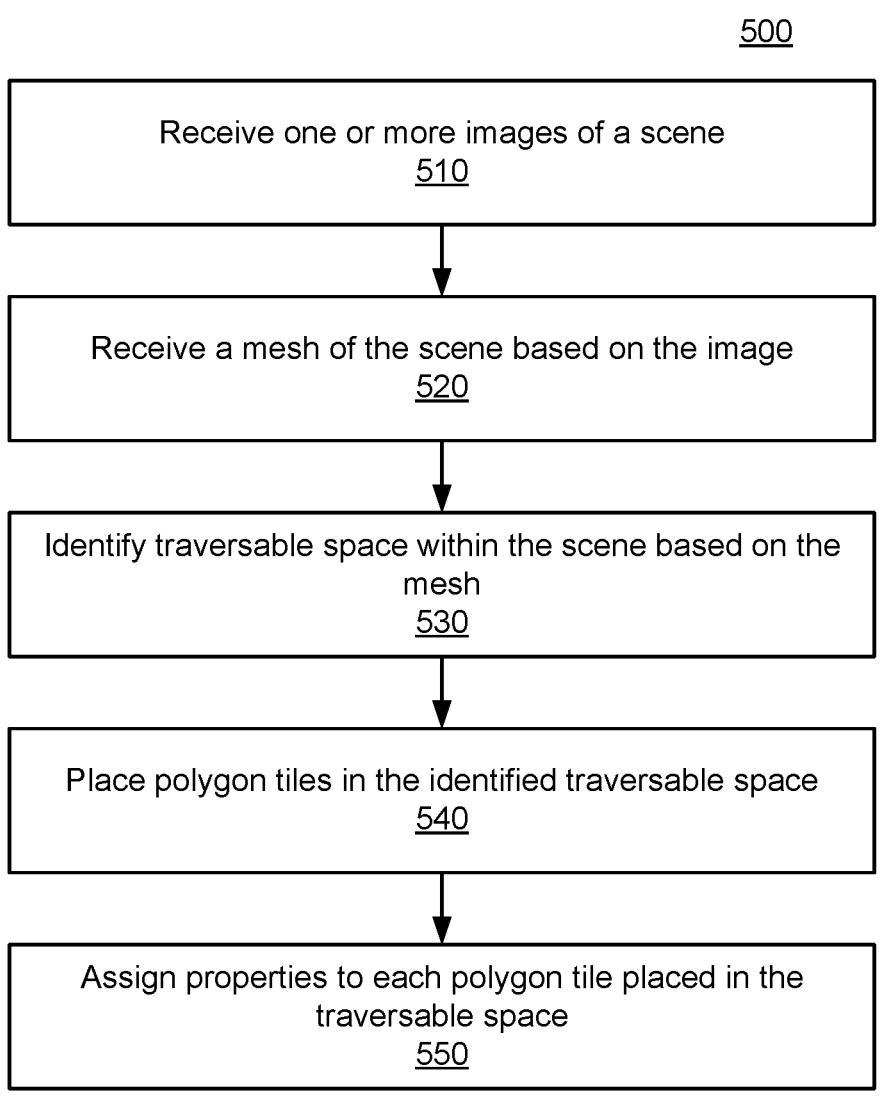
FIG. 5 is a flowchart describing a process for generating an augmented reality game board, in accordance with one or more embodiments.

FIG. 5 is a flowchart describing a method 500 for generating an augmented reality game board, in accordance with one or more embodiments. The method 500 yields a game board that can be overlaid on an image or video of a scene to enable an augmented reality game. The steps of FIG. 5 may be performed by the gaming module 135 of the client device 110. Alternatively, one or more steps of the method 500 may be performed by the game server 120, or by other components of the client device 110. In addition, some embodiments may perform the steps in parallel, perform the steps in different orders, or perform different steps.

In some embodiments, the method 500 begins with the gaming module 135 of the client device 110 receiving 510 one or more images of a scene. For example, the gaming module 135 of the client device 110 receives one or more images (such as a series of images from a video) captured using the camera assembly 125 of the client device 110.

The gaming module 135 receives 520 a mesh (such as a topographical mesh) based on the one or more images. In some embodiments, the mesh is generated by the topographical mesh management module 320 based on the received one or more images. Alternatively, the mesh is retrieved from the local topographical mesh store 325. In some embodiments, the gaming module 135 sends the one or more images to the game server 120 and receives a mesh for the scene depicted in the one or more images from the game server 120. That is, the game server may generate or retrieve a pre-generated mesh based on the one or more images received from the gaming module 135 of the client device 110 via the network 105.

In some embodiments, the mesh is retrieved based on a location of a location of the client device 110 (as determined by the positioning module 140). The topographical mesh management module 320 or the game server 120 may identify a mesh corresponding to a scene located at the current location of the client device and provides the identified mesh to the gaming module 135.

The game board generation module 350 identifies a traversable space within the scene based on the received mesh. In one embodiment, whether a mesh cell is traversable is semantic information determined by applying a classifier to data defining the mesh cell (e.g., by the semantic segmentation module 340). In other embodiments, the game board generation module 350 identifies the traversable space by identifying mesh cells that are parallel to a horizontal plane (e.g., a floor plane). The game board generation module 350 determines an angle between each of the mesh cells of the received mesh and the horizontal plane. The horizontal plane may be identified by various techniques, such as identifying a floor plane using a classifier or using a force sensor of the client device 110 to measure the gravity vector. The game board generation module 350 then classifies a mesh cell as traversable if the angle between the mesh cell and the horizontal plane is less than a threshold angle. In some embodiments, the game board generation module 350 may evaluate multiple mesh cells that are connected to each other and treat them as a single mesh cell if the standard deviation of the normal vectors of the mesh cells in a group is less than a threshold. This may prevent small anomalies in the mesh causing the game board generation module 350 to designate a portion of the mesh as being non-traversable when it is practically traversable for virtual characters. The game board generation module 350 may then add the mesh classified as traversable to the traversable space.

In some embodiments, in addition or instead of comparing the angle between a mesh cell to the horizontal plane to the threshold angle, the game board generation module 350 determines other metrics, such as a mean or median distance between the mesh cell and the horizontal plane, and compares the calculated metric or metrics to corresponding thresholds. In some embodiments, the game board generation module 350 determines an average distance between a plane defined by the mesh cell and the horizontal plane, and compares the average distance to the threshold distance. Alternatively, the game board generation module 350 determines whether any portion of the mesh cell is more than a threshold distance from a specified horizontal plane. In other embodiments, the game board generation module 350 may determine the distance between the plane defined by the mesh cell and the horizontal plane through methods such as random forests, support vector machines (SVMs), or winsorization. The game board generation module 350 then classifies a mesh cell as traversable if the angle between the mesh cell and the horizontal plane is less than the threshold angle and the distance between the mesh cell and the horizontal plane is less than the threshold distance. In other embodiments, the distance between the mesh cell and other planes may be used, such a vertical plane corresponding to a wall if the game board is to be placed on the wall or a plane angled relative to the horizontal plane if the ground in the environment depicted in one or more images is determined to be sloped.

The game board generation module 350 places 540 polygon tiles in the identified traversable space. In some embodiments, the game board generation module 350 places tiles having a preset shape and size. For example, the game board generation module 350 places square tiles having a 1 ft. (30 cm) by 1 ft. (30 cm) perimeter. In some embodiments, the shape and size of the tiles is selected based on a game being played by the user of the client device 110. Furthermore, the shape of the tiles may be restricted to shapes that are capable of tiling the plane. In some embodiments, the game board generation module 350 places tiles having multiple shapes or sizes in a preset pattern.

In some embodiments, the game board generation module 350 may also identify traversable surfaces using a virtual character configuration. As described above, the game board generation module 350 divides the topographical mesh into tiles. The game board generation module 350 determines an elevation measurement of each tile (e.g., a mean or median elevation of the portion of the topological mesh on which the tile was placed) and identifies contiguous groups of tiles using an agent or sliding window. The agent may be a virtual character chosen by the player or may be a virtual character used for determining connected tiles.

The game board generation module 350 may identify surfaces that are traversable by the virtual character selected by the player using properties of the virtual character. A surface being a set of contiguous tiles for which the virtual character can reach all of the tiles by traversing between adjacent tiles that do not have a height difference greater than a step or jump height for the virtual character. For example, a virtual character with a large step height (e.g., change in elevation) may be able to climb up a flight of steps of a given step height, while a virtual character with a smaller step height may not. In another example, the virtual character configuration (e.g., jump height/distance) may allow the virtual character to jump over gaps between disconnected surfaces. In some embodiments, the virtual character configuration may determine the size of tiles. Additionally, the game board generation module 350 may identify multi-level surfaces. For example, a first surface (e.g., floor surface) and a second surface (e.g., tabletop surface) positioned over the first surface.

Figure 6A:
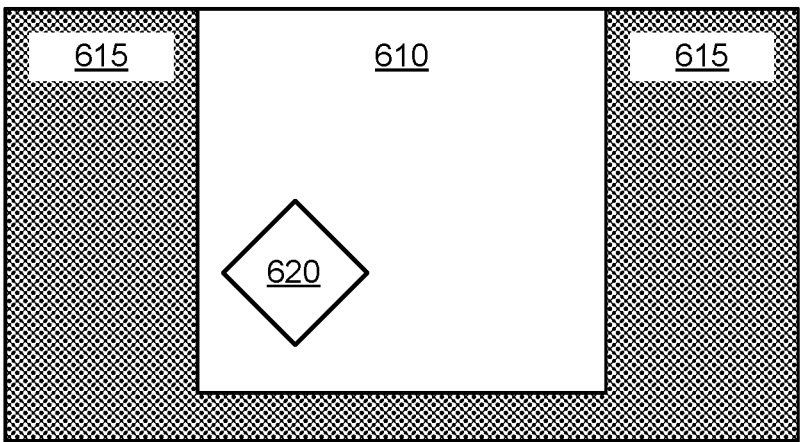
FIGS. 6A through 6C illustrate a process for placing tiles within a traversable space 610, according to one or more embodiments.
Figure 6B:
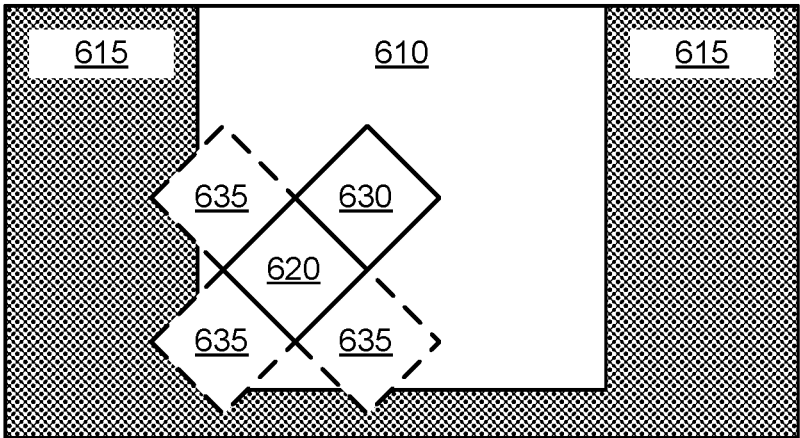
Figure 6C:
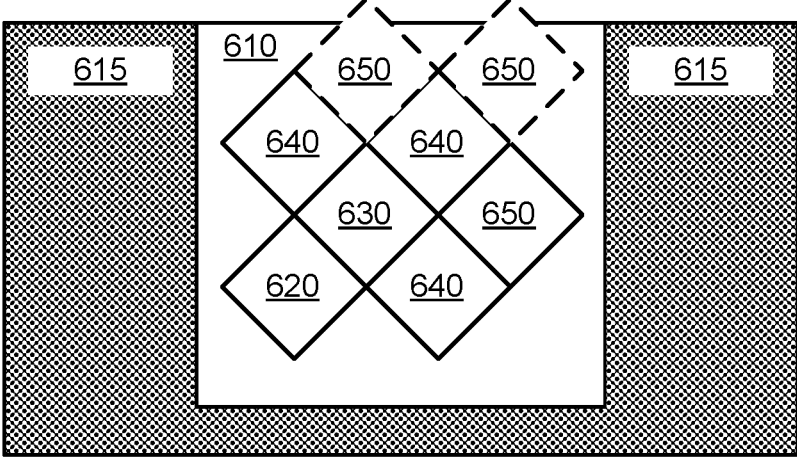

FIGS. 6A through 6C illustrate a process for placing tiles within a traversable space 610, according to one or more embodiments. As shown in FIG. 6A, to place the polygon tiles, the game board generation module 350 determines the placement of an initial tile 620. The game board generation module 350 may determine the location of the initial tile by identifying edges or boundaries of the traversable space 610, and places the initial tile 620 a set distance from the boundary of the traversable space 610.

The game board generation module 350 identifies the location of additional tiles based on the placement of the initial tile 620. For example, as shown in FIG. 6B, for each edge of the initial tile 620, the game board generation module 350 determines whether an additional tile placed adjacent to the initial tile along the edge of the initial tile overlaps with a non-traversable space 615. If the additional tile does not overlap with the non-traversable space 615, the game board generation module 350 adds the additional tile to the game board. In contrast, if the additional tile overlaps with the non-traversable space 615, the game board generation module 350 excludes the additional tile from the game board. For example, in the diagram of FIG. 6B, additional tile 630 does not overlap the non-traversable space 615 (i.e., it is completely contained within the traversable space 610), and additional tiles 635 overlap with the non-traversable space. As such, the game board generation module 350 adds the additional tile 630 that does not overlap with the non-traversable space 615 to the game board. In other embodiments, the game board generation module 350 adds tiles that overlap with the non-traversable area less than a threshold amount (e.g., less than 5%) to the game board.

The game board generation module 350 recursively adds further additional tiles by repeating the process for each additional tile that was added to the game board. For example, as shown in the diagram of FIG. 6C, the game board generation module 350 determines whether additional tiles 640 neighboring tile 630 overlap with the non-traversable space 615, and adds the additional tile 640 if the additional tile 640 does not overlap (or overlaps less than a threshold amount) with the non-traversable space 615. Similarly, for each of the tiles 640 added to the game board, the game board generation module 350 determines whether additional tiles 650 overlap with the non-traversable space 615, and adds the additional tile 650 if the additional tile 650 does not overlap (or overlaps less than a threshold amount) with the non-traversable space 615. This process is repeated until no more additional tiles can be added to the game board. In some embodiments, the game board generation module 350 builds the game board during an initialization phase of a parallel reality game. Alternatively, or in addition, the game board generation module 350 may continually update the game board as the user/player moves. The game board generation module 350 may obtain an updated topographical mesh (e.g., of a new scene accessed by the player as the player moves around the play area), and expands the game board by adding additional tiles to the game board to cover a traversable space of the new scene accessed by the player. That is, the game board generation module 350 identifies a traversable area of the new scene and appends tiles to the edges of the board game to expand the board game in the direction of the new scene.

In some embodiments, the game board generation module 350 uses other algorithms to determine the location of polygon tiles within the traversable space. For instance, the game board generation module 350 may overlay a grid of tiles over the traversable space and add the tiles from the grid that are completely enclosed within the traversable space to the game board. Alternatively, the game board generation module 350 may generate a game board that covers the traversable space completely and removes the tile that overlaps with the non-traversable space from the game board.

In some embodiments, the efficiency of the tile placement or the efficiency of the game board (i.e., the ratio between the area covered by the game board and the area of the traversable space) depends on the placement of the initial tile. In some embodiments, the placement of the initial tile is determined based on an initial viewpoint when the process for generation the game board is initiated. This may result in an unoptimized placement of tiles.

Figure 7A:
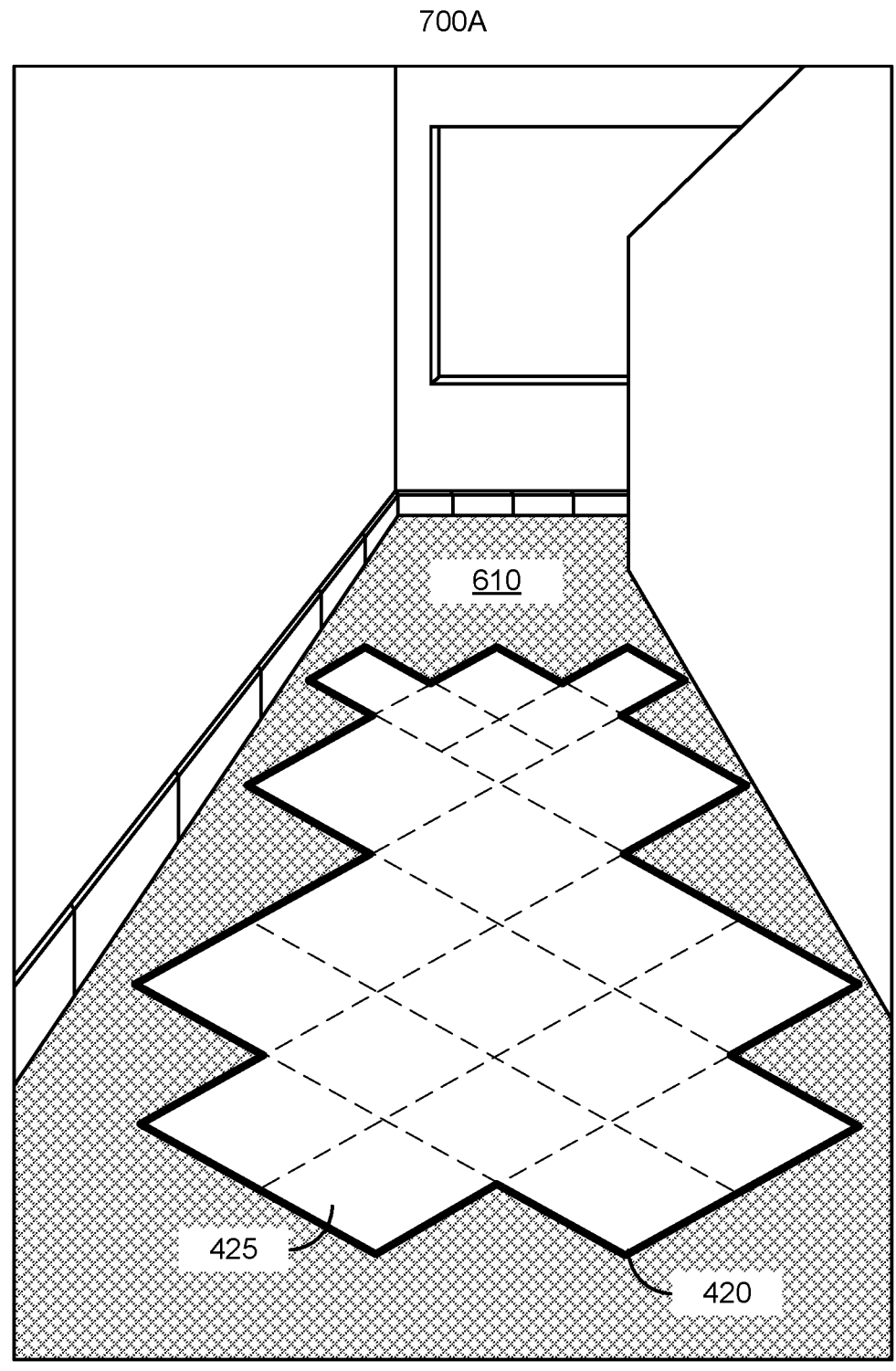
FIG. 7A depicts an exemplary game interface of a parallel reality game, in accordance with one or more embodiments.

FIG. 7A depicts an exemplary game interface 700A of a parallel reality game having a game board with an unoptimized tile placement, in accordance with one or more embodiments. As shown in the game interface 700A of FIG. 7A, the tiles 425 of the game board 420A are at an angle with respect to the boundaries of the traversable area 610. As such, the efficiency of the game board 420A is reduced.

The game board generation module 350 may optimize the placement of the tiles 425 of the game board 420 to increase the efficiency of the game board. For example, the game board generation module 350 determines the angle and placement of the initial tile 620 to increase the efficiency of the game board 420. In some embodiments, the game board generation module 350 generates multiple game boards, each having an initial tile with a different angle or location. The game board generation module 350 then calculates the efficiency of each of the generated game boards, and selects the game board having the largest efficiency. In other embodiments, tile positions and sizes, tile angles, distances and constraints (e.g., properties and overlapping surfaces) may be modeled as a discrete optimization problem (e.g., mixed integer problem). Algorithms such as a branch-and-bound algorithm may be used to solve the discrete optimization problem.

Figure 7B:
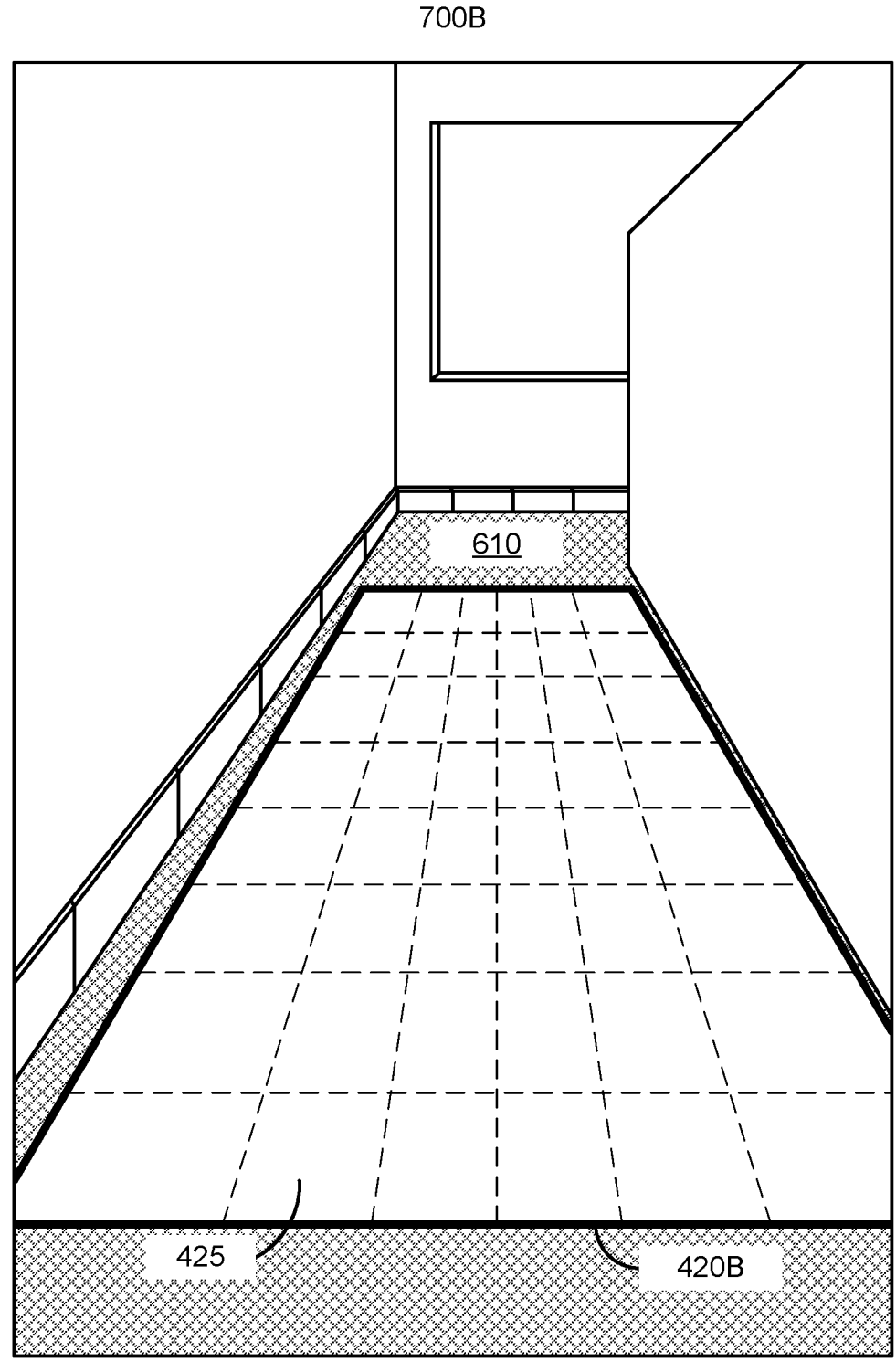
FIG. 7B depicts an exemplary game interface of a parallel reality game having a game board with an optimized tile placement, in accordance with one or more embodiments.

FIG. 7B depicts an exemplary game interface 700B of a parallel reality game having a game board with an optimized tile placement, in accordance with one or more embodiments. As shown in the game interface 700B of FIG. 7B, the portion of the traversable space 610 covered by the game board 420B of FIG. 7B is increased compared with the portion of the traversable space 610 covered by the game board 420a of FIG. 7A. For example, to increase the efficiency of the game board 420B, the game board generation module 350 rotates the tiles 425 of the game board. By rotating the tiles 425 of the game board, the tiles of the game board 420B of FIG. 4B are aligned with one or more boundaries of the traversable space 610.

Referring back to FIG. 5, the game board generation module 350 may assign 550 properties to each polygon tile of the game board. For example, the game board generation module 350 may determine a property for the tile based on a material of the surface at the location corresponding to the tile. The game board generation module 350 may assign one or more properties to the tile based on an output of the semantic segmentation module 340 for the mesh cells corresponding to the locations associated with the tile.

Figure 7C:
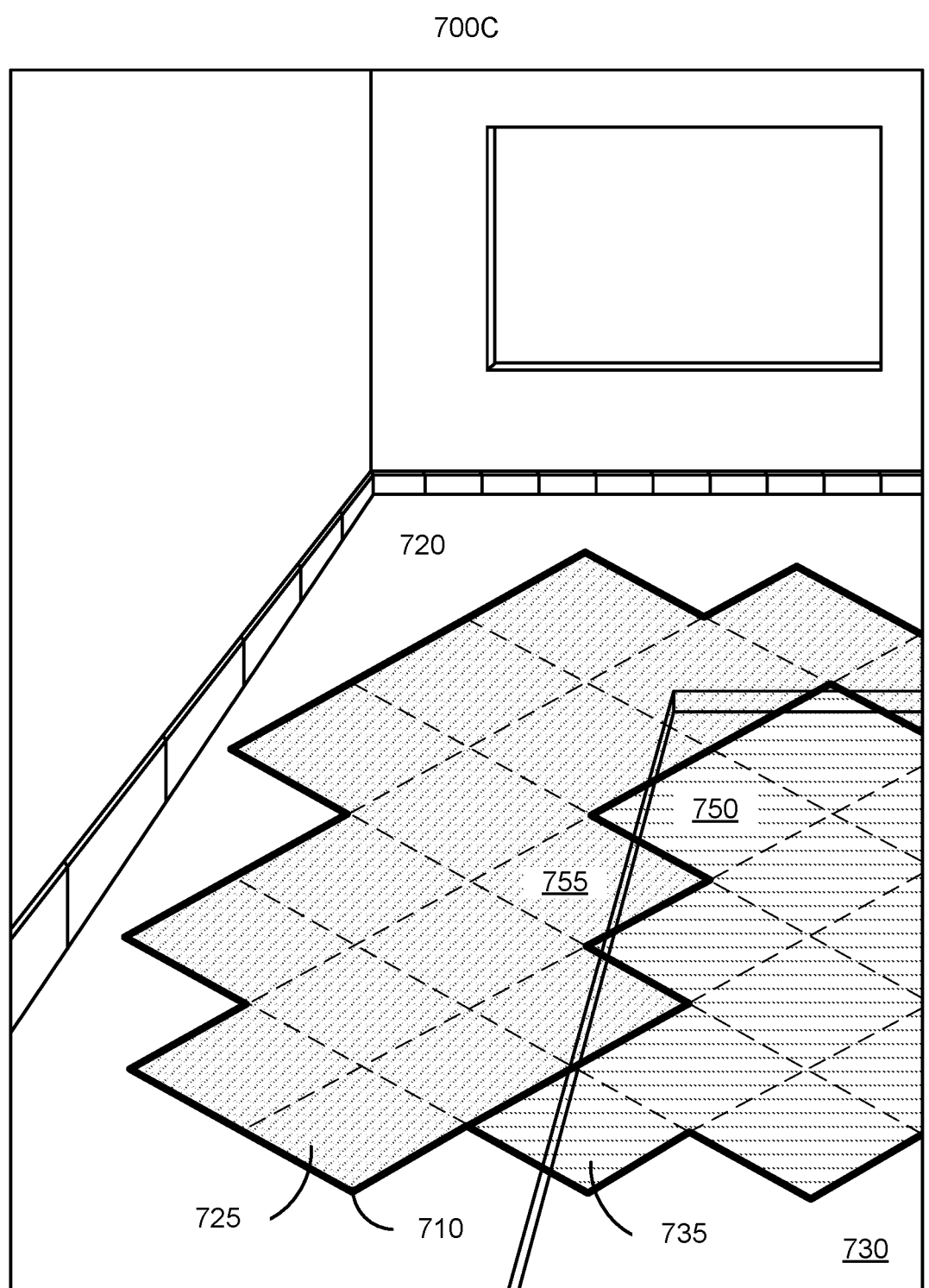
FIG. 7C depicts an exemplary game interface of a parallel reality game having a game board with tiles having different surface properties, in accordance with one or more embodiments.

FIG. 7C depicts an exemplary game interface 700C of a parallel reality game having a game board with tiles having different surface properties, in accordance with one or more embodiments. The game interface 700C of FIG. 7C shows a game board 710 having a first section including a first set of tiles 725 having a first property, and a second section including a second set of tiles 735 having a second property. The first set of tiles 725 are disposed over a first surface 720 made of a first material, and the second set of tiles 735 are disposed over a second surface 730 made of a second material. Specifically, in the example of FIG. 7C, the first set of tiles 725 are assigned the first property corresponding to the first material of the first surface 720, and the second set of tiles 735 are assigned the second property corresponding to the second material of the second surface 730. Additionally or alternatively, potential tiles that would have certain properties if placed may not be placed. For example, potential tiles that overlap with a first material (e.g., water) may be not placed so that those portions of the image (and hence physical environment) are unavailable for the placement of AR characters or other objects.

For example, the first surface 720 may be a concrete surface, while the second surface 730 may be a grass surface. The semantic segmentation module 340 may analyze images depicting the first surface 720 and may assign the mesh cells overlapping the first surface 720 a property indicating that the mesh cells correspond to a concrete surface. Similarly, the semantic segmentation module 340 may analyze images depicting the second surface 730 and may assign the mesh cells overlapping the second surface 730 a property indicating that the mesh cells correspond to a grass surface.

The game board generation module 350 then assigns each of the tiles of the game board a tile property based on the mesh cells overlapping with the tiles. In some embodiments, the tile property is determined based on the game being played by the user of the client device 110. For example, a game being played by the user of the client device may configure the game board generation module 350 to assign tiles overlapping with concrete surfaces a tile property corresponding to ice, and to assign tiles overlapping with grass surfaces a tile property corresponding to water. As such, in the parallel reality game that uses the generated game board, the tiles overlapping the first surface 720 appear to be made of ice and the tiles overlapping the second surface 730 appear to be made of water.

In some embodiments, one or more tiles overlap multiple surfaces, each associated with a different property. In this case, the game board generation module 350 may assign a property to the tile based on an amount of overlap of the tile with each of the surfaces. For example, the game board generation module 350 determines an amount of overlap between the tile and each of the surfaces, and assigns the property associated with the surface that has the largest amount of overlap with the tile. For example, the game board 710 includes a tile 750 having a first portion that overlaps with the first surface 720, and a second portion that overlaps with the second surface 730. The game board generation module 350 determines the area of the first portion and the area of the second portion and compares the area of the first portion to the area of the second portion. If the area of the first portion is larger than the area of the second portion, the game board generation module 350 assigns the property corresponding to the first surface 720 to the tile 750. Alternatively, if the area of the second portion is larger than the area of the third portion, the game board generation module 350 assigns the property corresponding to the second surface 730 to the tile 750.

In the example of FIG. 7C, the second portion of the tile 750 that overlaps with the second surface 730 is larger than the first portion of the tile 750 that overlaps with the first surface 720. As such, the tile 750 is assigned the property corresponding to the second surface 730. Additionally, the game board 710 includes a tile 755 having a first portion overlapping with the first surface 720 and a second portion overlapping with the second surface 730. Here, the first portion of the tile 755 overlapping the first surface 720 is larger than the second portion of the tile 755 overlapping the second surface 730. As such, the tile 755 is assigned the property corresponding to the first surface 720.

Procedurally Generated Augmented Reality Game Board

Figure 8:
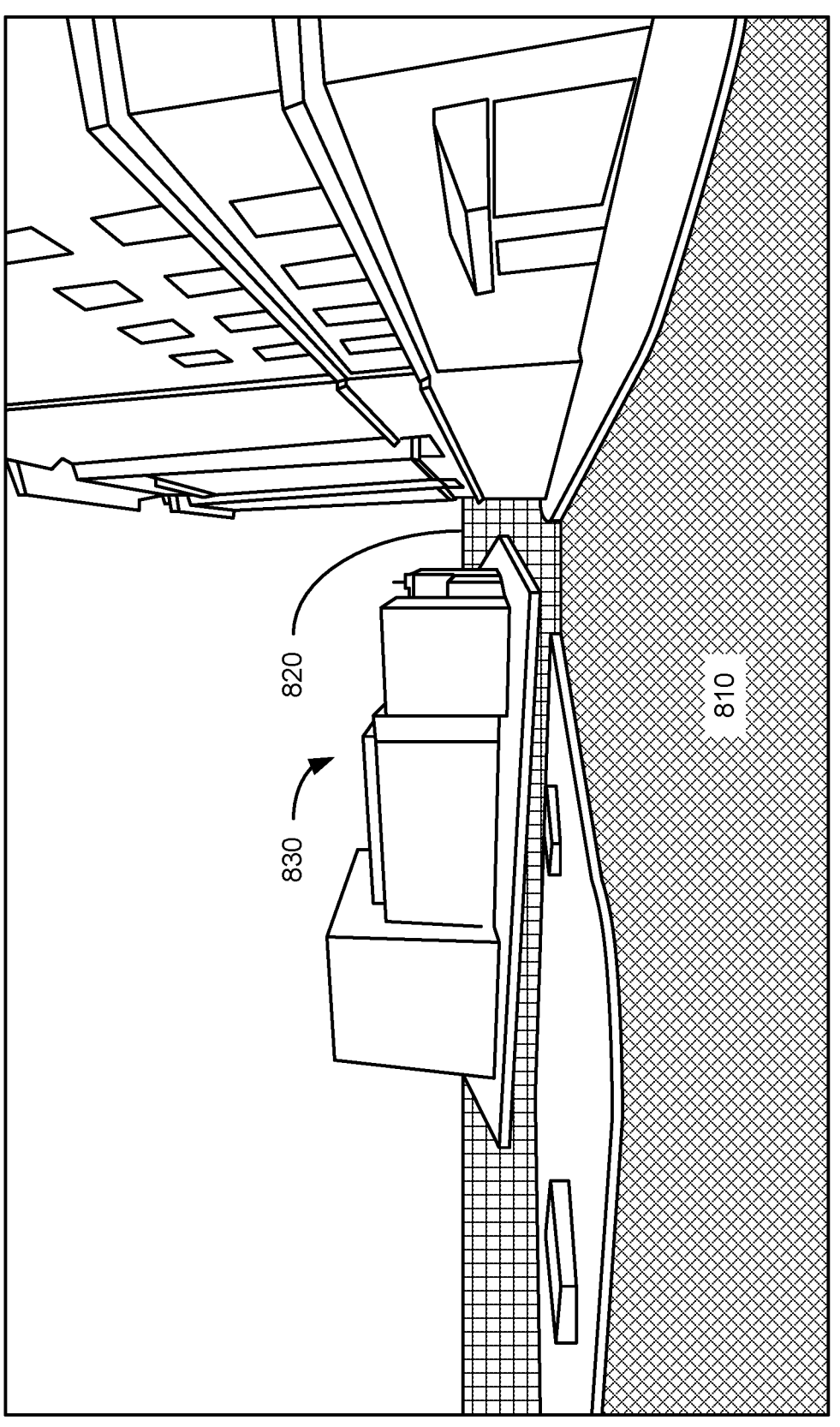
FIG. 8 depicts an exemplary game interface of a parallel reality game with a procedurally generate game board, in accordance with one or more embodiments

FIG. 8 depicts an exemplary game interface 800 of a parallel reality game that can be presented on a display of a client device 110 as part of the interface between a player and a virtual world (such as the virtual world 210 of FIG. 2) or a parallel reality world, in accordance with one or more embodiments. The game interface 800 of FIG. 8 uses a procedurally generated game board or a dynamic game board that expands as the player performs certain actions, as the player moves around the game board, or as events occur in the virtual world.

In some embodiments, the game board generation module 350 generates a game board around a region 810 close to the player. The portion of the game board around the region 810 may be generated in response to a request for the game board (e.g., generated by a player requesting to perform a certain action or activate a specific mode within the game) or automatically (e.g., on the client device 110 being in a position for which the game board has not already been generated). In one embodiment, the game board generated around the region 810 close to the player is generated based on one or more images captured by using the camera assembly 125 of the client device 110 of the player. For example, based on the one or more images captured using the camera assembly 125 of the client device 110 of the player, a height field or a mesh is generated and a traversable in the region 810 close to the player is identified. Based on the identified traversable area, the game board generation module generates the game board. Alternatively, location data (e.g., GPS data) for a client device 110 may be used to retrieve a pre-generated height field or topographical mesh for the immediate vicinity of the client device (e.g., from the game server 120).

The game board generation module 350 may expand the game board to include a region 820 far (e.g., beyond a threshold distance) from the location of the user. In some embodiments, the region 820 includes regions that are visible from the location of the user. However, the region 820 may be at a distance that cause an accuracy or confidence level in the identification of a traversable area using heightfields and topographical meshes generated from camera data to drop below a certain threshold. The generation of the game board in region 820 may be performed based on a combination of information collected from the client device 110 of the player (such as one or more images captured by the camera assembly 125 of the client device 110, depth information captured by a depth sensor of the client device, etc.). and information received from external sources (such as 3D map information received from the game server 120).

The game board generation module 350 may also expand the game board to include regions 830 that are not visible to the client device 110. For example, the region 830 may include an area that is occluded by buildings or other large objects. In the example of FIG. 8, the region 830 include a road that is behind a set of buildings. In one embodiment, the game board generation module 350 generates the game board for region 830 based on 2D map data (e.g. retrieved from the game server 120).

Figure 9:
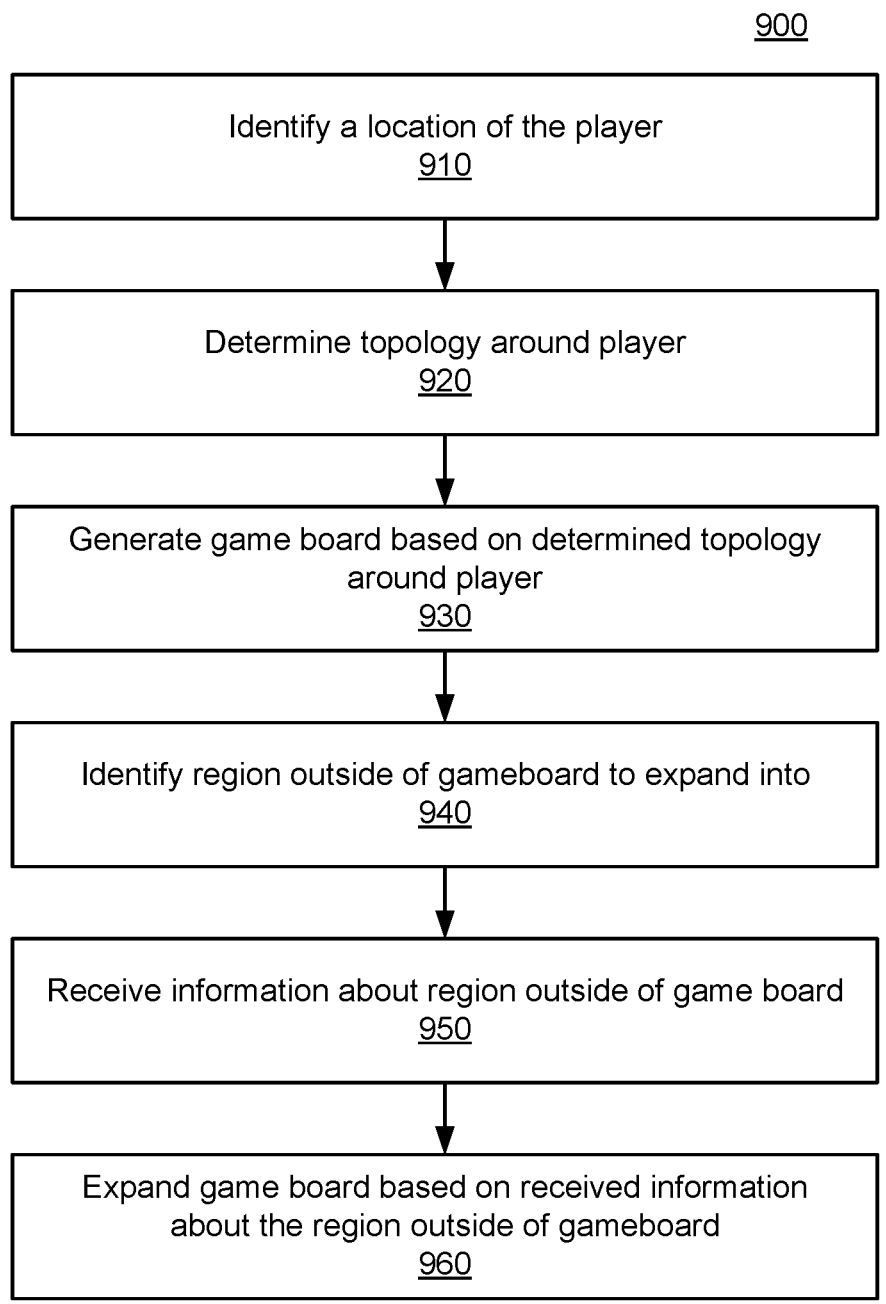
FIG. 9 is a flowchart describing a method for dynamically generating an augmented reality game board, in accordance with one or more embodiments.

FIG. 9 is a flowchart describing a method 900 for dynamically generating an augmented reality game board, in accordance with one or more embodiments. The method 900 yields a game board that can be used to place virtual object or characters in the virtual world of an augmented reality game. The steps of FIG. 9 may be performed by the gaming module 135 of the client device 110. Alternatively, one or more steps of the method 900 may be performed by the game server 120, or by other components of the client device 110. In addition, some embodiments may perform the steps in parallel, perform the steps in different orders, or perform different steps.

In some embodiments, the method 900 begins with the gaming module 135 of the client device 110 identifying a location of the player. In some embodiments, the gaming module 135 determines the location of the player by determining the location of the client device of the player. For instance, the gaming module 135 may determine the location of the client device 110 of the player using a global positioning system (GPS) signal, using a video positioning system (VPS) analysis, or a combination thereof.

The gaming module 135 determines 920 a topology around the player and generates 930 a game board based on the determined topology around the player. The gaming module 135 may determine the topology round the player and generates the game board using the process described in FIG. 5. For example, the gaming module 135 may generate a mesh or determine a height field based on one or more images (or a video) captured using the camera assembly 125 of the client device 110 of the player, and generates the game board based on the mesh or height field.

The gaming module 135 may identify 940 one or more regions outside of the existing gameboard in which to expand the gameboard beyond the boundaries of the current game board. For example, the game logic of the parallel reality game may select to spawn an object or character in a location outside the current range of the game board. In some embodiments, the gaming module 135 receives an indication of a location for expanding the game board.

The gaming module 135 receives 950 information about the identified regions outside of the current game board. Specifically, the gaming module 135 receives information about the regions that are going to be used for expanding the current game board. In some embodiments, the gaming module 135 receives the information about the topology of regions outside of the current game board from the game server 120. Alternatively, or in addition, the gaming module 135 receives the information about the topology of regions outside of the current game board from third party systems. The gaming module 135 may receive different or additional information about the regions outside of the gameboard, such as semantic properties. In some embodiments, the gaming module 135 sends a request identifying one or more regions and receives the information about those regions. That is, the gaming module 135 sends a requests identifying the regions that will be used for expanding the current game board and receives information (e.g., topology and other geographic information) about those regions.

In some embodiments, the topology information includes height information of points within the identified one or more regions. In other embodiments, the topology information includes a mesh or 3D map information about the identified one or more regions. In some embodiments, the gaming module 135 receives different topology information for different regions. For example, as players explore the world using the parallel reality game, the game server 120 analyzes the topology of locations where players have used the parallel reality game and stores the topology information of those locations. When a gaming module 135 of a client device of a player request topology information of a region that had been previously analyzed, the game server 120 sends the stored topology information for the region generated based on the previous analysis to the gaming module 135 of the client device. However, if the gaming module 135 of the client device of the player requests topology information of a region that has not been previously analyzed (or that has not been analyzed within a threshold amount of time) by the game server 120, the gaming server 120 sends the gaming module 135 of the client device 120 less accurate topology information for the requested region. For example, the gaming module 135 may send 3D map information or satellite image information (or information derived therefrom) about the requested region to the gaming module 135 of the client device of the player.

Based on the received topology information, the gaming module 135 expands 960 the game board. For example, the gaming module 135 identifies a traversable area within the identified region for expanding the game board and appends the identified traversable area to the traversable area of the current game board.

In some embodiments, the properties of the traversable area within the identified region for expanding the game board is determined based on the topology information received by the gaming module 135. Moreover, the properties of the traversable area is additionally determined based on the distance between the identified region for expanding the game board and the location of the client device. Specifically, an algorithm for determining the properties of the traversable area may depend on the distance between the identified region for expanding the game board and the location of the client device. Alternatively, the properties of the traversable area are determined based on a confidence level of the accuracy of the received topology information. For example, an algorithm for determining the properties of the traversable area depends on the confidence level of the accuracy of the received topology information.

In some embodiments, the properties for of the traversable area (such as a height value of points within the traversable area and semantic of the points within the traversable area) is determined based on a weighted average or weighted combination of multiple sources. Each of the sources may be weighted based on a confidence level of the corresponding source. In some embodiments, a confidence level for the topological information of a region received from certain sources depends on a distance between the client device of the player and the region. For example, the topological information for a region determined based on images captured by the camera assembly 125 of the client device 110 or sensor data captured by the client device 110 depends on the distance between the client device 100 and the region. As a distance between the region and the client device 110 increases, the confidence level of the topological information determined based on the image captured by the camera assembly 125 of the client device 110 or sensor data captured by the client device 110 decreases.

In other embodiments, the gaming module 135 periodically updates the topology information of and updates the properties of the traversable area based on the updated topological information. For example, as the player moves around the world, the gaming module 135 the client device 110 of the player captures images or sensor data of the surroundings of the client device. When the player moves to a second location, the client device 110 captures images or sensor data of the surroundings of the second location. Based on the images or sensor data captured for the surroundings of the second location, the gaming module 135 updates the topological information of the area surrounding the second location. Based on the determined topological information, the gaming module 135 updates the properties of the game board corresponding to the area surrounding the second location.

As such, the gaming module 135 is able to expand the game board for a player beyond the immediate surroundings of the player by using topological information from sources that are less accurate than topological information determined based on images or sensor data captured by the client device. As the player approaches regions that correspond to locations where the game board was generated using less accurate sources, the properties of the game board at those locations can be updated based on newly captured information by the camera assembly or sensors of the client device 110.

In some embodiments, this additionally allows the gaming module 135 to expand the game board to locations that are not visible by the camera assembly or sensors of the client device. For example, the gaming module 135 is able to expand the game board to locations behind buildings or other large objects. The gaming module 135 may determine the properties of the game board at the locations that are not visible by the client device using the topological information from the less accurate sources and may update the properties of the game board at those locations when the player moves to a second location from where the location that was not visible by the client device becomes visible.

In various embodiments, the gaming module 135 determines a game board at multiple distances with corresponding levels of detail/granularity. The example embodiment described above has three regions of game board with corresponding levels of detail, but it should be appreciated that any number of regions may be used. Each region is determined from corresponding geographic data, such as camera images, 3D map data, 2D map data, and other geo-located data such as weather reports, population densities, user counts in a preceding time period, or the like. Image segmentation may also be used to apply properties to the game board based on images of the corresponding portions of the real-world environment. For example, the portion of a topographical mesh corresponding to a building may be assigned tags such as "building," "concrete," "office," " etc. based on segmentation classifiers that are applied to images showing the building captured by a client device 110.

A parallel-reality game may dynamically place virtual elements (e.g., objects or characters) in a procedurally generated gameboard according to semantic properties of the game board. The game may specify one or more properties of a desired location for a virtual element and query the game board for a location that meets the desired properties. In some embodiments, multiple possible locations may be returned with matching scores indicating how closely that the identified location meets the desired properties and/or a confidence level in the suitability of the location. The search for suitable locations may start with a region immediately around the client device for which a semantic topological mesh may be generated using the sensors of the client device (e.g., extending to a distance of about five meters from the client device). If no suitable locations are found, the search may extend to a next region that is further away from the client device but still visible to the camera of the device. This region may be modeled using a combination of images captured by the client device, previous images captured by other devices, 3D map data, 2D map data, and/or any other available information. If this second region also does not have a suitable location, a third region may be searched with is out of view of the client device and/or sufficiently far away that it is effectively out of view. The suitability of locations in this third region may be determined from 2D map data and other geographic information available to the client device.

To give a specific example, a virtual bird may be intended to be placed in a tree. To find a location for the virtual bird, the client device may first search a segmentation map generated from camera images captured by the client device to identify potential trees. If a suitable tree is found, the bird may be placed in the tree. Conversely, if no tree is found, the search may be extended to a more distant region visible to the camera of the client device. The client device may identify portions of the image that correspond to forest in the background for which individual trees cannot be accurately segmented and place the bird in the forest. As the player moves towards the forest, a new topographical map with semantic information may be generated that can resolve individual trees and the bird may be placed in a suitable tree. Finally, if no trees are visible to the camera at all, the client device may search a 2D map for a wooded area and place the bird in that wooded area. The client device may present an arrow or other indicator to direct the player towards the bird. As before, as the player gets closer to the bird, the game board may be updated with greater precision and the bird ultimately placed in a specific tree.

In one embodiment, virtual items can be positioned by searching for locations with a specific object, material, or other property. Examples include placing virtual objects on physical objects (e.g., tables, benches, chairs, beds, etc.), placing objects on surfaces of particular materials (e.g., water, grass, concrete, sand, etc.), or placing objects in certain types of location (e.g., indoor public spaces, parks, roads, fields, etc.). More complex properties for a desired location may also be specified. For example, a game may query for an object that is large enough for a virtual character to hide behind. If the virtual character is a rabbit, a small bush nearby that is in the topological map generated by the client device may be a suitable location. Because the location and shape of the bush can be relatively accurately determined from the camera images, a realistic animation of the virtual rabbit running behind the bush and even peering out from behind it may be provided. In contrast, if the virtual character is Godzilla®, then the location may be behind a building in the background of images captured by the device camera. In this case, because the building is far away, its location need not be known with a high degree of precision. A believable experience can be generated by scaling the virtual character based on a relatively inaccurate estimate of the distance to the building.

To give another example, when a player approaches a skittish virtual character, it may attempt to run and hide. The query may be for a suitable hiding location, which may be evaluated using a range of factors, such as a percentage of directions from which the location is visible from a predetermined distance away (e.g., five meters), the lighting level of the location, the number of other players or virtual characters within a threshold distance (e.g., ten meters) of the potential hiding spot, and the materials making up the location, etc.

Exemplary Computing System

Figure 10:
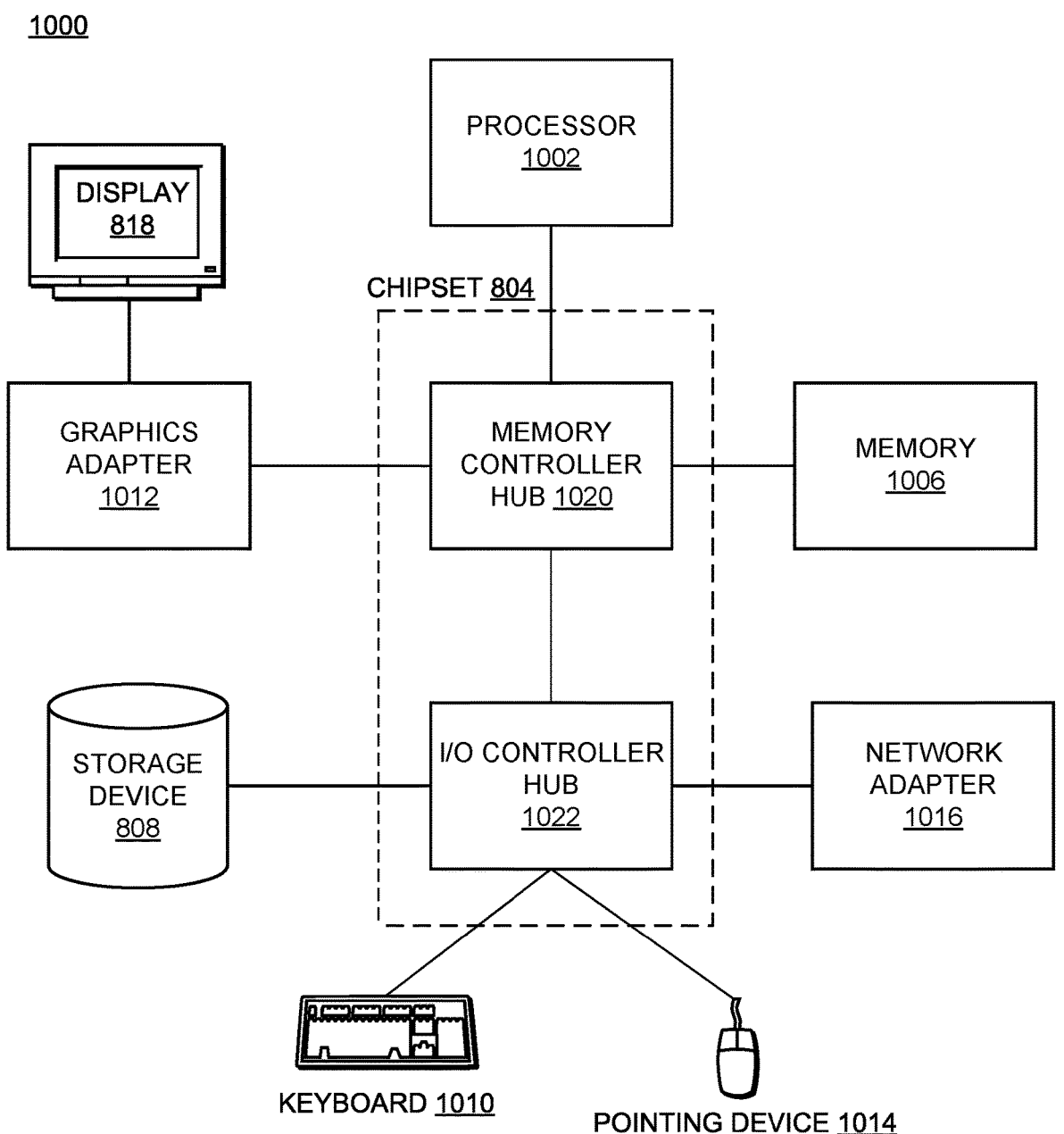
FIG. 10 illustrates an example computer system suitable for use in generating an augmented reality game board, according to one or more embodiments.

FIG. 10 is an example architecture of a computing device, according to an embodiment. Although FIG. 10 depicts a high-level block diagram illustrating physical components of a computer used as part or all of one or more entities described herein, in accordance with an embodiment, a computer may have additional, less, or variations of the components provided in FIG. 10. Although FIG. 10 depicts a computer 1000, the figure is intended as functional description of the various features which may be present in computer systems than as a structural schematic of the implementations described herein. In practice, and as recognized by those of ordinary skill in the art, items shown separately could be combined and some items could be separated.

Illustrated in FIG. 10 are at least one processor 1002 coupled to a chipset 1004. Also coupled to the chipset 1004 are a memory 1006, a storage device 1008, a keyboard 1010, a graphics adapter 1012, a pointing device 1014, and a network adapter 1016. A display 1018 is coupled to the graphics adapter 1012. In one embodiment, the functionality of the chipset 1004 is provided by a memory controller hub 1020 and an I/O hub 1022. In another embodiment, the memory 1006 is coupled directly to the processor 1002 instead of the chipset 1004. In some embodiments, the computer 1000 includes one or more communication buses for interconnecting these components. The one or more communication buses optionally include circuitry (some-times called a chipset) that interconnects and controls communications between system components.

The storage device 1008 is any non-transitory computer-readable storage medium, such as a hard drive, compact disk read-only memory (CD-ROM), DVD, or a solid-state memory device or other optical storage, magnetic cassettes, magnetic tape, magnetic disk storage or other magnetic storage devices, magnetic disk storage devices, optical disk storage devices, flash memory devices, or other non-volatile solid state storage devices. Such a storage device 1008 can also be referred to as persistent memory. The pointing device 1014 may be a mouse, track ball, or other type of pointing device, and is used in combination with the keyboard 1010 to input data into the computer 1000. The graphics adapter 1012 displays images and other information on the display 1018. The network adapter 1016 couples the computer 1000 to a local or wide area network.

The memory 1006 holds instructions and data used by the processor 1002. The memory 1006 can be non-persistent memory, examples of which include high-speed random-access memory, such as DRAM, SRAM, DDR RAM, ROM, EEPROM, flash memory.

As is known in the art, a computer 1000 can have different and/or other components than those shown in FIG. 10. In addition, the computer 1000 can lack certain illustrated components. In one embodiment, a computer 1000 acting as a server may lack a keyboard 1010, pointing device 1014, graphics adapter 1012, and/or display 1018. Moreover, the storage device 1008 can be local and/or remote from the computer 1000 (such as embodied within a storage area network (SAN)).

As is known in the art, the computer 1000 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 1008, loaded into the memory 1006, and executed by the processor 1002.

ADDITIONAL CONSIDERATIONS

Some portions of above description describe the embodiments in terms of algorithmic processes or operations. These algorithmic descriptions and representations are commonly used by those skilled in the data processing arts to convey the substance of their work effectively to others skilled in the art. These operations, while described functionally, computationally, or logically, are understood to be implemented by computer programs comprising instructions for execution by a processor or equivalent electrical circuits, microcode, or the like. Furthermore, it has also proven convenient at times, to refer to these arrangements of functional operations as modules, without loss of generality.

As used herein, any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments. This is done merely for convenience and to give a general sense of the disclosure. This description should be read to include one or at least one and the singular also includes the plural unless it is obvious that it is meant otherwise.

Upon reading this disclosure, those of skill in the art will appreciate still additional alternative structural and functional designs for a system and a process for determining or using the repeatability of interest points. Thus, while particular embodiments and applications have been illustrated and described, it is to be understood that the described subject matter is not limited to the precise construction and components disclosed herein and that various modifications, changes and variations which will be apparent to those skilled in the art may be made in the arrangement, operation and details of the method and apparatus disclosed.

What is claimed is:

1. A computer-implemented method comprising:
    determining to expand a game board of a parallel reality game, a request identifying a region outside of the game board;
    receiving topology information for the region outside of the game board from a plurality of sources;
    determining a level of confidence of the received topology information from each source of the plurality of sources; and
    expanding the game board based on a combination of the received topology information, wherein the topology information is combined based on the determined confidence level for each source of the plurality of sources.

2. The computer-implemented method of claim 1, wherein the received topology information includes height information of points within the region.

3. The computer-implemented method of claim 1, wherein the received topology information includes a mesh or three-dimensional (3D) map information about the region.

4. The computer-implemented method of claim 1, further comprising:
    analyzing topology of locations where players of the parallel reality game have used the parallel reality game; and
    storing respective topology information corresponding to the locations where the players of the parallel reality game have used the parallel reality game.

5. The computer-implemented method of claim 1, wherein the request is a first request, and wherein the region is a first region, the computer-implemented method further comprising:
    in response to receiving a second request identifying a second region that has not yet been previously analyzed to determine corresponding topology information, transmitting one or more of 3D map information or satellite image information about the second region.

6. The computer-implemented method of claim 1, further comprising:
    identifying a first traversable area within the game board;
    identifying a second traversable area within the region for expanding the game board; and
    appending the second traversable area to the first traversable area within the game board.

7. The computer-implemented method of claim 6, further comprising:
    determining properties of the second traversable area based on (i) the received topology information and (ii) a distance between the region outside of the game board and a present location of a client device of a player of the parallel reality game.

8. The computer-implemented method of claim 6, wherein a third traversable area within the region for expanding the game board is identified based on the combination of the received topology information, wherein expanding the game board based on the combination of the received topology information comprises:
    appending the third traversable area to the first traversable area within the game board.

9. The computer-implemented method of claim 7, further comprising:
    periodically receiving updated topology information for the region outside of the game board; and
    updating the properties of the second traversable area based on the updated topology information.

10. The computer-implemented method of claim 1, wherein the region is a first region, further comprising:
    detecting that a player of the parallel reality game is located at a second region of the game board associated with topology information having a level of confidence below a threshold accuracy;
    obtaining updated topology information for the second region from a camera assembly or sensors of a client device associated with the player; and
    modifying one or more properties of the game board at the second region based on the updated topology information.

11. A computer-implemented method comprising:
    determining properties associated with locations on a game board of a parallel reality game;
    receiving a query for a location on the game board, the query specifying a desired criterion;
    in response to the query, identifying a candidate location on the game board by performing a search of the locations on the game board for locations that satisfy the desired criterion specified by the query;
    calculating a suitability score for each of the candidate locations; and
    selecting one of the candidate locations with a suitability score above a threshold.

12. The computer-implemented method of claim 11, wherein performing the search of the locations on the game board for locations that satisfy the desired criterion specified by the query comprises:

performing an initial search of a region within a predefined distance of a client device of a player of the parallel reality game.

13. The computer-implemented method of claim 12, further comprising:

generating a semantic topological mesh for the region within the predefined distance using one or more sensors of the client device.

14. The computer-implemented method of claim 12, wherein the region is a first region, the computer-implemented method further comprising:

in response to determining that a location satisfying the desired criterion is not in the first region, performing a search of a second region that is greater than the predefined distance away from the client device, the second region visible to a camera of the client device.

15. The computer-implemented method of claim 11, wherein the query is a first query, the location is a first location, and the desired criterion is a first desired criterion, the computer-implemented method further comprising:

receiving a second query specifying a second desired criterion; and determining, based on image data from a camera of a client device of a player of the parallel reality game, that locations visible to the camera do not satisfy the second desired criterion; and searching two dimensional (2D) map data to determine a candidate location that satisfies the second desired criterion.

16. The computer-implemented method of claim 11, wherein the desired criterion comprises one or more of a presence of a particular object, a presence of a particular material, or a minimum size of a desired object.

17. The computer-implemented method of claim 16, wherein the particular material is one of water, grass, concrete, or sand.

18. A non-transitory computer-readable medium comprising stored instructions that, when executed, cause a computing system to perform operations including:

determining to expand a game board of a parallel reality game, a request identifying a region outside of the game board;

receiving topology information for the region outside of the game board from a plurality of sources;

determining a level of confidence of the received topology information from each source of the plurality of sources; and expanding the game board based on a combination of the received topology information, wherein the topology information is combined based on the determined confidence level for each source of the plurality of sources.

19. A non-transitory computer-readable medium comprising stored instructions that, when executed, cause a computing system to perform operations including:

determining properties associated with locations on a game board of a parallel reality game;

receiving a query for a location on the game board, the query specifying a desired criterion;

in response to the query, identifying a candidate location on the game board by performing a search of the locations on the game board for locations that satisfy the desired criterion specified by the query;

calculating a suitability score for each of the candidate locations; and selecting one of the candidate locations with a suitability score above a threshold.

* * * * *